United States Patent
Kishimoto et al.

(10) Patent No.: US 6,964,811 B2
(45) Date of Patent: Nov. 15, 2005

(54) MAGNETIC POWDER, METHOD FOR PRODUCING THE SAME AND MAGNETIC RECORDING MEDIUM COMPRISING THE SAME

(75) Inventors: Mikio Kishimoto, Moriya (JP); Yuji Sasaki, Kyoto-fu (JP); Shinichi Kitahata, deceased, late of Moriya (JP); by Yumiko Kitahata, legal representative, Moriya (JP); Hideaki Watanabe, Kyoto-fu (JP)

(73) Assignee: Hitachi Maxell, Ltd., Ibaraki (JP)

( * ) Notice: Subject to any disclaimer, the term of this patent is extended or adjusted under 35 U.S.C. 154(b) by 10 days.

(21) Appl. No.: 10/369,657

(22) Filed: Feb. 21, 2003

(65) Prior Publication Data

US 2004/0072025 A1 Apr. 15, 2004

(30) Foreign Application Priority Data

Sep. 20, 2002 (JP) ..................... P2002-274435

(51) Int. Cl.$^7$ .............................. G11B 5/706
(52) U.S. Cl. .................. 428/402; 428/407; 428/692; 428/694 BA
(58) Field of Search .................. 428/694 BA, 402, 428/407, 692, 694 B, 694 BS, 694 BN

(56) References Cited

U.S. PATENT DOCUMENTS

| | | |
|---|---|---|
| 4,020,236 A | 4/1977 | Aonuma et al. |
| 4,324,177 A | 4/1982 | Tsuji et al. |
| 4,451,535 A | 5/1984 | Pingaud et al. |
| 4,643,942 A | 2/1987 | Ohtsubo |
| 4,952,444 A | 8/1990 | Kawamata et al. |
| 5,156,922 A | 10/1992 | Mishima et al. |
| 5,252,380 A | 10/1993 | Nakazumi et al. |
| 5,380,905 A | 1/1995 | Haidos et al. |
| 5,496,607 A | 3/1996 | Inaba et al. |
| 5,518,804 A | 5/1996 | Mizuno et al. |
| 5,637,390 A | 6/1997 | Isobe et al. |
| 5,645,917 A | 7/1997 | Ejiri et al. |
| 5,935,674 A | 8/1999 | Saito et al. |
| 6,372,338 B1 | 4/2002 | Jeffers et al. |
| 6,517,934 B1 * | 2/2003 | Kishimoto .................. 428/323 |

FOREIGN PATENT DOCUMENTS

| | | |
|---|---|---|
| JP | 52-5720 A | 2/1977 |
| JP | 55-86103 A | 6/1980 |
| JP | 57-183629 A | 11/1982 |
| JP | 60-130103 A | 7/1985 |
| JP | 60-157719 A | 8/1985 |
| JP | 05-090018 * | 3/1991 |
| JP | 03-097203 A | 4/1991 |
| JP | 4-19815 A | 1/1992 |
| JP | 5-234064 A | 9/1993 |
| JP | 6-25702 A | 2/1994 |
| JP | 6-139553 A | 5/1994 |
| JP | 2000-277311 A | 10/2000 |
| JP | 2000-315312 A | 11/2000 |
| JP | 2001-67649 A | 3/2001 |
| JP | 2001-176715 A | 6/2001 |
| JP | 2002-288817 A | 10/2002 |
| WO | WO00/0048210 * | 8/2000 |

OTHER PUBLICATIONS

MAchine Translation of JP05–090018.*
Machine Translation of JP2000–277311.*
Nagatomi et al., Powder and Powder Metallurgy, vol. 46, No. 2, pp. 151–155, (1999).
Hattori et al., Trans. Of the Mag. Soc. Of Japan, vol. 25, pp. 927–930, (2001).

* cited by examiner

*Primary Examiner*—Stevan A. Resan
(74) *Attorney, Agent, or Firm*—Birch, Stewart, Kolasch & Birch, LLP

(57) ABSTRACT

A magnetic powder consisting of substantially spherical or ellipsoidal particles comprising a transition metal which comprises iron and a rear earth element which is mainly present in the outer layer of the magnetic powder particles, and having a particle size of 5 to 200 nm, a coercive force of 80 to 400 kA/m and a saturation magnetization of 10 to 25 uWb/g.

31 Claims, 3 Drawing Sheets

MAGNETIC POWDER, METHOD FOR PRODUCING THE SAME AND MAGNETIC RECORDING MEDIUM COMPRISING THE SAME

This nonprovisional application claims priority under 35 U.S.C. § 119 (a) on Patent Application No. 2002-274435 filed in JAPAN on Sep. 20, 2002, which is herein incorporated by reference.

FIELD OF THE INVENTION

The present invention relates to a magnetic powder comprising iron and a rare earth element, a method for producing the same and a magnetic recording medium comprising the same. In particular, the present invention relates to a magnetic recording medium which is particularly suitable for use in ultra-high density recording, for example, a digital video tape, a backup tape of a computer, a large capacity Floppy® disc, etc.

BACKGROUND ART

It is required to further increase a recording density of magnetic recording media with the shift of a writing-reading system from an analog system to a digital system. In particular, when video tapes and backup tapes of computers, which face severe competition with hard discs or optical discs, cannot satisfy the above requirement, the continuance of the products may be endangered.

To satisfy the requirement to the increase the recording density, magnetic recording media comprising a thin film of a magnetic layer are proposed. However, so-called coating type magnetic recording media, which are produced by applying a magnetic paint containing a magnetic powder dispersed in a binder on a non-magnetic support, are superior to the thin metal film type ones in view of the productivity, and practical reliability such as corrosion resistance. Roughly speaking, the electromagnetic conversion characteristic of the coating type magnetic recording media has been improved by the improvement of magnetic powders and the improvement of production methods.

In connection with the improvement of the magnetic powders, the magnetic properties are year-by-year improved in conjunction with the miniaturization of the particle size to cope with the short-wavelength recording. Formerly, magnetic powders such as ferromagnetic iron oxide powder, cobalt-modified ferromagnetic iron oxide powder and chromium oxide powder, which are used for audio tapes or domestic video tapes, are mainly used also for high density recording magnetic recording media, but recently acicular metal magnetic powders having a particle size of about 0.1 $\mu$m is proposed for the high density recording magnetic recording media.

To prevent the decrease of output due to the demagnetization in the short wavelength recording, a coercive force has been increased year-by-year, and the alloy of iron-cobalt achieved a coercive force of about 198.9 kA/m (see U.S. Pat. No. 5,252,380, JP-A-5-234064, JP-A-6-25702, JP-A-6-139553, etc.)

In connection with the improvement of the production methods of the magnetic recording media, the use of binders having various functional groups, the improvement of the dispersing technique of the above magnetic powders, and the improvement of the calendering method after the application process can remarkably increase the surface smoothness of the magnetic layers, and thus greatly contribute to the increase of the output in the short wavelength range (see U.S. Pat. No. 4,324,177, U.S. Pat. No. 4,952,444, JP-A-4-19815, etc.)

However, since the recording wavelength is shortened with the recent increase of the recording density, the influences of self-demagnetization loss in the course of writing and reading and thickness loss due to the thickness of the magnetic layer, which have not caused any problem, increase, and thus sufficient dissolution may not be attained. Such problems cannot be solved by the above-described improvement of the magnetic properties of the magnetic powders or the increase of the surface properties achieved by the production methods of the media. Thus, it is proposed to decrease the thickness of the magnetic layer.

In general, the effective thickness of the magnetic layer is about one third ($\frac{1}{3}$) of the shortest recording wavelength used in a system. For example, with the shortest recording wavelength of 1.0 $\mu$m, the thickness of the magnetic layer should be about 0.3 $\mu$m. Furthermore, with the miniaturization of a cassette, the whole thickness of the magnetic recording medium should be decreased to increase a recording capacity per unit volume. Consequently, the thickness of the magnetic layer should be decreased. In addition, to increase the recording density, the area of a writing magnetic flux, which is generated with a magnetic head, should be decreased, and thus the magnetic head is miniaturized. Therefore, the amount of the generated magnetic flux decreases. Accordingly, the magnetic layer should be made thin to cause complete reversal of magnetization with the minute magnetic flux.

When the thickness of the magnetic layer is decreased, the surface roughness of the non-magnetic support has some influence on the surface of the magnetic layer and thus the surface properties of the magnetic layer tend to deteriorate. Furthermore, when the thickness of a single magnetic layer is decreased, it may be contemplated to decrease the solid concentration of a magnetic paint or to decrease the amount of the magnetic paint applied. However, these methods cannot prevent defects formed in the course of application, or achieve the increase of the filling of the magnetic powder. Therefore, the strength of the coated film may deteriorate. Accordingly, to decrease the thickness of the magnetic layer by the improvement of the production methods of the magnetic recording media, a so-called simultaneous multiple layer coating method is proposed, which comprises providing an undercoat layer between a non-magnetic support and a magnetic layer, and applying a magnetic paint of the upper magnetic layer while the undercoat layer is still wet (see U.S. Pat. No. 4,863,793, U.S. Pat. No. 4,963,433, U.S. Pat. No. 5,645,917, U.S. Pat. No. 5,380,905, U.S. Pat. No. 5,496,607, etc.)

With such improvements of the coating methods, it becomes possible to thinly coat a magnetic layer having a thickness of about 1.0 $\mu$m, and such thin film-coating methods and the above-described improvement of the magnetic powders can solve the various problems such as the decrease of the output caused by the demagnetization, which is the essential problem of longitudinal recording.

However, in these days, the improvements of the magnetic powders and the production methods of the magnetic recording media reach the limits. In particular, in the case of the improvement of the magnetic powders, insofar as the acicular magnetic powder is used, the practical lower limit of the particle size is about 0.1 $\mu$m, because when the particle size is less than about 0.1 $\mu$m, a specific surface area of the particle increases greatly, and thus not only the saturation magnetization decreases but also the dispersion of the magnetic powder in the binder becomes very difficult.

In connection with the coercive force, signals can be recorded on magnetic recording media having a very high coercive force because of the technical innovation of the magnetic heads. In particular, in the case of the longitudinal recording system, it is desirable to increase the coercive force to as high as possible to prevent the deterioration of the output due to the writing and reading demagnetization, insofar as the recorded signals can be erased with the magnetic head. Accordingly, the realistic and most effective method to increase the recording density of the magnetic recording media is to increase the coercive force of the media.

It is effective to further decrease the thickness of the magnetic layer to suppress the influence of the decrease of the output caused by the writing and reading demagnetization, which is the essential problem of the longitudinal recording. However, the thickness of the magnetic layer will reach the limit, insofar as the above-described acicular magnetic powder having a particle size of about 0.1 μm is used. The reason is as follows: the acicular particles are aligned in the plane direction of the magnetic recording medium on the average by longitudinal orientation, but some particles may be aligned in the direction perpendicular to the plane of the medium since the orientation of the particles has distribution. When such particles are contained, they deteriorate the surface smoothness of the medium and may increase noise. Such problems become more serious as the thickness of the magnetic layer decreases.

When the magnetic layer is made thin, it is necessary to dilute the magnetic paint with a large amount of an organic solvent. However, the conventional miniaturized acicular magnetic powder particles tend to cause the agglomeration of the magnetic paint. In addition, since a large amount of the organic solvent is evaporated when the applied magnetic paint is dried, the orientation of the magnetic powder particles is tend to be disturbed. Thus, in the case of tape-form media which are longitudinally recorded, the desired electromagnetic conversion may not be attained because of the deterioration of the orientation and the surface properties, even if the magnetic layer is made thin. Thus, it is very difficult to produce coating type magnetic recording media having the further decreased thickness of the magnetic layer, insofar as the conventional acicular magnetic powder is used, although it is known that the decrease of the thickness of the magnetic layer is effective to increase the recording characteristics of the media in the case of longitudinal recording.

Among the already proposed magnetic powders, the barium ferrite magnetic powders having platelet particle shapes, and comprising very fine magnetic particles with a particle size of 50 nm are known (see JP-B-60-50323, JP-B-6-18062, etc.) The shapes and particle sizes of the barium ferrite magnetic powders are more suitable for the production of the thin-layer coating type magnetic recording media than the acicular magnetic powders. However, since the barium ferrite magnetic powder is an oxide, its saturation magnetization is at most about 7.5 μWb/g, and thus it is theoretically impossible to achieve a saturation magnetization of 12.6 μWb/g or more, which is the level of the saturation magnetization of acicular metal or alloy magnetic powders. Therefore, when the barium ferrite magnetic powder is used, the high output cannot be attained since the saturation magnetization is low, although the coating type magnetic recording media comprising a thin magnetic layer may be produced. Thus, the barium ferrite magnetic powders are not suitable for the high recording density magnetic recording media. For the above reason, the above-described acicular magnetic powders has been dominantly used as the magnetic powders for the high recording density magnetic recording media.

As explained above, it is a very important problem to reduce the particle size of a magnetic powder while maintaining the coercive force and saturation magnetization at a as high level as possible to reduce thickness of the magnetic layer, which is an effective measure to increase the recording density of the magnetic recording media. To solve such a problem, firstly, the magnetic characteristics of the conventional magnetic powders are discussed. In the case of the currently used acicular magnetic powders, the increase of the coercive force has a limit theoretically, since its coercive force is based on the shape anisotropy of the acicular particles. That is, the magnetic anisotropy based on the shape anisotropy is expressed by $2\pi I_s$ wherein $I_s$ is a saturation magnetization, and thus proportional to the saturation magnetization. Thus, the coercive force increases as the saturation magnetization increases in the case of the acicular magnetic powders the coercive force of which is based on the shape anisotropy.

The saturation magnetization of a magnetic metal or alloy, for example, an Fe—Co alloy reaches the maximum near a Fe/Co ratio of 70/30, as is well known from the Slater-Pauling's curve. Therefore, the coercive force also reaches the maximum at the above composition of the alloy. The acicular magnetic powder of such a Fe—Co alloy having a Fe/Co ratio of about 70/30 is already practically used.

The magnitude of the magnetic anisotropy based on the shape anisotropy is expressed by $2\pi I_s$ as explained above. The factor is about $2\pi$ when the acicular ratio (particle length/particle diameter) of the magnetic powder is about 5 or more, but the factor quickly decreases when the acicular ratio is less than about 5. Finally the anisotropy disappears, when the particle becomes a sphere. That is, insofar as magnetic materials of metal iron or Fe—Co alloys are used as the magnetic powders, the shape of the magnetic powder particles should be in the acicular form (needle form) from the theoretical viewpoint.

DISCLOSURE OF THE INVENTION

In view of the above circumstances, it may be inevitable to create a novel magnetic powder which is based on a new concept different from the above-described conventional magnetic powder to attain the breakthrough of the coating type magnetic recording media. Then, based on the above, the objects of the present invention are as follows:

(I) To provide a novel magnetic powder, which is entirely different from the conventional magnetic powders, as a magnetic powder for a magnetic recording medium having a very thin magnetic layer.

(II) To provide a coating type magnetic recording medium comprising such a novel magnetic powder and having excellent magnetic characteristics which cannot be achieved by the conventional magnetic powders.

(III) To provide a magnetic recording medium having much improved writing-reading characteristics in comparison with the coating type recording media comprising the conventional magnetic powders.

To achieve the above objects, the inventors set forth the basic guideline that the properties of magnetic powders necessary to remarkably increase the recording density of the coating type magnetic recording medium having a thin magnetic layer are the following properties (1) through (6), and have screened raw materials and studied methods for the production of magnetic powders suitable for such a magnetic recording medium:

(1) A coercive force is made as high as possible in the range where the recorded signals can be erased with a magnetic head;

(2) A magnetic powder comprises iron, which has the largest saturation magnetization among single elements and is abundantly available as a natural resource;

(3) A magnetic powder is that of a metal, a metal alloy or a metal compound to achieve high saturation magnetization;

(4) The particle shape of a magnetic powder is close to a sphere having the minimum specific surface area;

(5) The particle size of a magnetic powder is made as small as possible while maintaining saturation magnetization; and (6) A magnetic powder has a uniaxial magnetic anisotropy one direction (axis) of which is a magnetization easy direction (axis).

When the present inventors have made study to develop a magnetic powder which satisfies all the above properties, it has been found that a magnetic powder of spherical or ellipsoidal particles having a particle size of 5 to 200 nm and comprising metal iron, an iron alloy or an iron compound in which a rare earth element is mainly present in the outer layer of the magnetic powder particles satisfies all these properties and has good characteristics.

The term "spherical or ellipsoidal" used herein is intended to mean any shape from a substantial sphere to a substantial ellipsoid and includes particles having uneven surfaces or slightly deformed "spherical or ellipsoidal" particles as shown in the photographs of FIGS. 1 and 2. Hereinafter, those particles are collectively referred to as "spherical or ellipsoidal" particles.

It has also been found that, when the following method is employed as a method for allowing the rare earth element to be present mainly in the outer surface of the magnetic powder particles, the intended magnetic powder can be produced:

Spherical or ellipsoidal particles of magnetite, cobalt-ferrite, etc. are dispersed in an aqueous solution containing at least rare earth element ions, an aqueous solution of an alkaline material is added to the dispersion in a molar amount sufficient for converting the rare earth element ions to a hydroxide to form a surface layer of the hydroxide on the particles of magnetite or cobalt-ferrite, and then the particles are recovered by filtration, dried and reduced by heating. Furthermore, it has been found that an excellent high density magnetic recording medium can be obtained when a thin layer coating type magnetic recording medium is produced using the above magnetic powder of the present invention. In addition, it has been revealed that a magnetic recording medium comprising the above magnetic powder of the present invention has a high coercive force and a high magnetic flux density although the magnetic powder comprises spherical or ellipsoidal ultra-fine particles.

With a magnetic recording medium comprising a magnetic powder of spherical or ellipsoidal fine particles having a very small particle size like the magnetic powder of the present invention, magnetic interactions between the magnetic powder particles and thus it is possible to effect very quick reversal of magnetization so that the range of the reversal of magnetization is narrowed. Accordingly, such a magnetic recording medium has much better recording characteristics than magnetic recording media comprising the conventional acicular magnetic powders. Furthermore, the magnetic recording medium according to the present invention achieves the intended effects, particularly when the thickness of the magnetic layer is 3 $\mu$m or less, and the magnetic recording medium having such a thin magnetic layer is less influenced by a demagnetizing field, and exhibits good recording properties even at a coercive force of about 80 kA/m.

As a result of the further studies based on the above findings, it has been found that the magnetic powder and the magnetic recording medium exhibit the distinguished performances, when a magnetic recording medium having the following characteristics.

With the recent trend to the high recording density, the digital recording systems have become predominant as described above. Thus, magnetic recording media are required to have a low error rate. From the above viewpoint, the present invention can provide a magnetic recording medium for digital recording having the excellent properties which cannot be achieved by the conventional magnetic recording media, when it satisfies the following requirements:

A) A magnetic recording medium has at least one undercoat layer comprising an inorganic powder and a binder on a non-magnetic support, and a magnetic layer comprising a magnetic powder and a binder on the undercoat layer, and the magnetic layer has an average thickness of 0.3 $\mu$m or less (when the magnetization easy directions of a magnetic layer are in the longitudinal direction or randomly distributed, the average thickness is preferably 0.2 $\mu$m or less, more preferably 0.01 to 0.15 $\mu$m, most preferably 0.01 to less than 0.1 $\mu$m);

B) The anisotropic magnetic field distribution of a magnetic layer is set in a specific range;

C) The magnetization-easy-direction of a magnetic layer is in the machine (longitudinal) direction of the medium, a coercive force is from 80 to 400 kA/m, a squareness is from 0.6 to 0.9, and a saturated magnetic flux density is from 0.1 to 0.5 T, in the machine direction;

D) For applications in which the short wavelength characteristics are important, the magnetization-easy-direction is in a direction perpendicular to the magnetic layer plane, a coercive force is from 60 to 320 kA/m, a squareness is from 0.5 to 0.8, and a saturated magnetic flux density is from 0.1 to 0.5 T, in the perpendicular direction.

When the magnetic recording medium of the present invention is used in a disc form, it is preferable that E) the magnetization-easy-directions are randomly distributed in the magnetic layer plane, and that a coercive force is from 45 to 320 kA/m, a squareness is from 0.4 to 0.7, and a saturated magnetic flux density is from 0.1 to 0.5 T, in any directions in the magnetic layer plane and the direction perpendicular to the magnetic layer plane.

In the case of the magnetic recording media comprising the conventional acicular magnetic powders, since the magnetic powder particles are mechanically oriented in a specific direction, a certain deorientation treatment is necessary. When the magnetic powder of the present invention is used, such deorientation may not be necessary, which is one of the large advantages of the present invention.

In the system using the recording with a short wavelength of 1.0 $\mu$m for the purpose of the high density recording, the above thin layer coating type magnetic recording media have been improved to attain the high output. As a result, F) it has been found that the high output can be obtained when a P-V value (in terms of the optical interference type three-dimensional surface roughness) is 50 nm or less.

Furthermore, the magnetic powder particles of the present invention are substantially not mechanically oriented so that they are aligned in parallel with the in-plane direction of the magnetic layer along the machine direction. Thus, the studies have been made to make use of the properties of the spherical or ellipsoidal magnetic powder. As a result, it has been found that G) a high elasticity is achieved in the transverse direction of the magnetic recording medium so that a good head touch, which is required to improve the properties in a helical scan system, is achieved.

EMBODIMENTS FOR CARRYING OUT THE INVENTION

Figure 1:
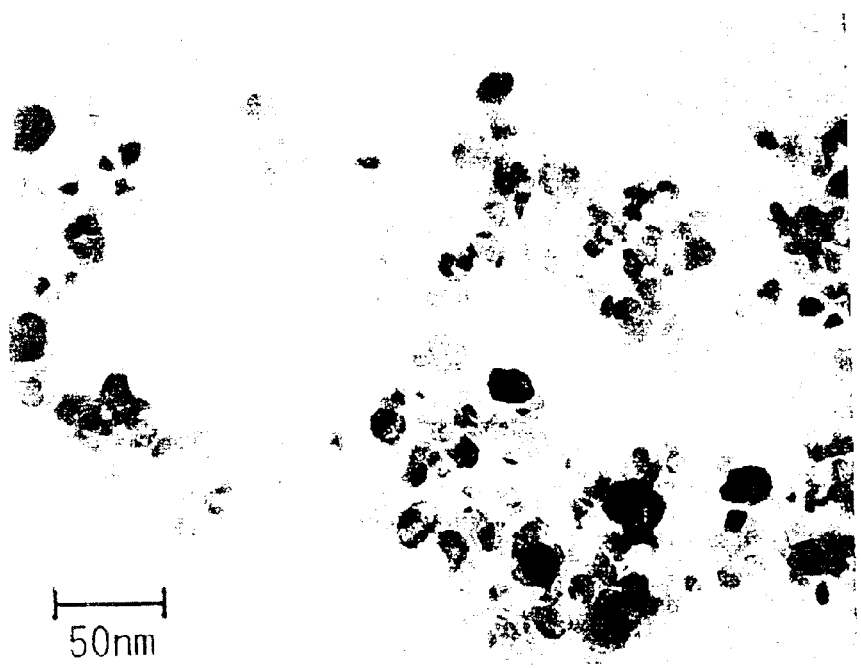
FIG. 1 is a transmission electron microscopic photograph (magnification: 300,000 times) of the samarium-iron-cobalt magnetic powder, which is produced in Example 1.

With the conventional acicular iron-cobalt alloy magnetic powder, which is used for high density coating type magnetic recording medium, in connection with the particle size (5) of the above guidelines, it is difficult to disperse the powder in a binder, if the particle size is further decreased from the current particle size. In addition, the most serious problem is that it is impossible to achieve the properties (4) and (6) at the same time, because the acicular ratio can be reduced only to about 5 since the coercive force is based on the shape anisotropy, that is, the acicular shape, and if the acicular ratio is further decreased to less than 5, the uniaxial anisotropy deteriorates and thus the coercive force becomes too small.

From the view point different from the magnetic powders based on the shape magnetic anisotropy, the present inventors have synthesized various magnetic powders to improve the magnetic properties in accordance with the above-described basic guideline, and checked the magnetic anisotropy of the magnetic powders. Then it has been found that magnetic materials comprising a transition metal such as iron or an iron-cobalt alloy containing a rare earth element have large crystalline magnetic anisotropy, and therefore it is not necessary to form the particles in an acicular shape and that, when the particles are in the spherical or ellipsoidal shape, the magnetic powder has a large coercive force in one direction. In particular, the magnetic powder exhibits further improved characteristics, when the core of the magnetic powder comprises at least one of metal iron, an iron alloy and an iron compound while the rare earth element is present mainly in the outer layer of the magnetic powder particles.

Herein, the ellipsoidal magnetic powder particles mean those having a ratio of the major axis to the minor axis of 2 or less, in particular, 1.5 or less. Therefore, the magnetic powder particles of the present invention have essentially different shapes from those of the conventional powder particles for the magnetic recording media.

Among the magnetic materials comprising a rare earth element and a transition metal, rare earth element-iron-boron magnetic materials are known as high performance magnetic materials comprising particles of a submicron order, which are produced by powder metallurgical methods.

For example, a neodymium-iron-boron magnetic material for a permanent magnet has a composition represented by $Nd_2Fe_{14}B$, and a very large coercive force of 800 kA/m or more. Such a coercive force is too high for magnetic recording media, but the present inventors found that the coercive force of such a magnetic material can be adjusted to a range suitable for magnetic recording media by controlling the contents of a rare earth element and boron (see JP-A 2001-181754).

The rare earth element-iron-boron magnetic material having the composition of $Nd_2Fe_{14}B$ has the very high coercive force as described above. In the previous invention described above, it was also found that when samarium (Sm) or yttrium (Y) is used as a rare earth element in place of Nd, the magnetic powder has a coercive force sufficient for use in the magnetic recording media (see JP-A 2001-181754).

In the field of permanent magnets comprising neodymium-iron-boron compounds, the contents of the rare earth element, the transition metal and boron are optimized to achieve as high coercive force as possible, but the present inventors have found that a coercive force which is lower than that of the permanent magnets but is suitable for magnetic recording media can be attained by controlling the contents of the rare earth element and boron. Furthermore, as a result of the detailed study of the mechanism for achieving such a coercive force, it has been found that, when the rare earth element is present mainly in the outer layer of the magnetic powder particles, the magnetic powder has a coercive force suitable for magnetic recording in the absence of boron. Thus, the present invention has been completed.

That is, the present inventors firstly notice and successfully use the rare earth element-iron-boron magnetic materials, which attracted attentions as permanent magnet materials, as magnetic powders for magnetic recording media in a lower coercive force range than that of the permanent magnet materials, and develop the completely new field of magnetic materials.

As described above, the present inventors fully analyzed the rare earth element-iron-boron magnetic materials, which are completed technically and theoretically, and intended to develop a magnetic powder for magnetic recording media based on this magnetic materials. As a result, it has been found that a high coercive force is achieved in the range where the recorded signals can be erased with a magnetic head, and also the excellent electromagnetic conversion characteristics as the thin layer coating type magnetic recording media can be attained, when a magnetic powder comprises a rare earth element and iron but no boron, contains a rare earth element mainly in the outer layer of the magnetic powder particles and has a spherical or ellipsoidal shape with a particle size of 5 to 200 nm. As the rare earth element contained in such magnetic powders, at least one element selected from the group consisting of yttrium, ytterbium, cesium, praseodymium, samarium, lanthanum, europium, neodymium and terbium is used. Among them, when neodymium, samarium, yttrium and/or terbium are used, a high coercive force can be easily attained. In addition, the above effects are maximized when an iron-cobalt alloy is used as a transition metal and the contents of iron and cobalt are in an atomic ratio range of 3:97 to 40:60 (a ratio of cobalt to iron).

As the transition metal, metal iron or an alloy comprising iron is preferable, although an iron-containing compound such as iron nitride can be used apart from such an alloy.

The magnetic powder of the present invention exhibits the excellent magnetic properties for high density magnetic recording media, when it has a particle size of 5 to 200 nm. With the conventional acicular magnetic powder, the lower limit of the average particle size is about 0.1 μm to maintain the high coercive force. However, the magnetic powder of the present invention can be made very fine to have the average particle size of at least 5 nm, and such fine particles can exhibit good magnetic properties, since the coercive force is mainly based on the crystalline magnetic anisotropy. In particular, the average particle size is preferably at least 8 nm, more preferably at least 10 nm.

When the average particle size of the magnetic powder is too large, the filling properties of the magnetic powder in the magnetic layer deteriorate, and also the surface properties deteriorate when the magnetic layer is made thin. In addition, the particle noise due to the particle size increases when the magnetic recording medium is produced using such a magnetic powder having a large average particle size. Accordingly, the average particle size should be 200 nm or less and is preferably 100 nm or less, more preferably 50 nm or less. When the average particle size is adjusted in such a range, the very high filling properties are attained, and the excellent saturated magnetic flux density is achieved.

Herein, the average particle size of the magnetic powder is obtained by measuring the particle sizes of 500 particles in the transmission electron microscopic (TEM) photograph taken at a magnification of 100,000 times and averaging the measured particle sizes, or by measuring the particle sizes of 300 particles in the transmission electron microscopic photograph taken at a magnification of 200,000 times and averaging the measured particle sizes. The former method is used unless otherwise indicated.

When the iron alloy is used among the metal iron, iron alloy and iron compound which contribute to the increase of the saturation magnetization in the magnetic powder comprising the rare earth element and iron, examples of metals which form alloys with iron include magnetic transition metals such as Mn, Zn, Ni, Cu, Co, etc. Among them, Co and Ni are preferable. In particular, Co is preferable. As described above, when the iron-cobalt alloy is used, a large saturation magnetization is obtained as can be seen from the Slater-Pauling's curve. In addition, the alloying of cobalt contributes to the increase of a coercive force.

As the iron compound, iron nitride, which comprises nitrogen, or iron nitride a part of iron atoms are replaced with a transition metal element is preferable. A various types of iron nitride having different compositions are known. Particularly, iron nitride of the formula: $Fe_{16}N_2$ or $Fe_{16}N_2$ a part of iron atoms of which are replaced with a transition metal element is preferable to achieve the high coercive force and the high saturation magnetization.

The amount of the rare earth element contained in the magnetic powder of the present invention is from 0.2 to 20 atomic %, preferably from 0.5 to 15 atomic %, more preferably from 1.0 to 10 atomic %, based on the transition metals. In the rare earth element-iron-boron magnetic powder, which is the subject of the previous invention by the present inventors, it is preferable that the rare earth element, iron and boron are uniformly contained in the magnetic powder to achieve the high coercive force. The magnetic powder of the present invention is greatly different from the magnetic powder of the previous invention in that the rare earth element is present mainly in the outer layer of the magnetic powder particles to achieve the high coercive force. As a result, a coercive force suitable for magnetic recording media can be attained in the absence of boron which has been considered to be essential to achieve the high coercive force. Since the magnetic powder contains the rare earth element in the outer layer of the particles in a high concentration and exhibits the coercive force by the surface effect thereof, the small content of the rare earth element, such as 10 atomic % or less, based on the amount of the transition metal can achieve a coercive force of 80 to 400 kA/m which is suitable as a magnetic powder for high performance magnetic recording media.

To produce such a magnetic powder, the novel method of the present invention disperses spherical or ellipsoidal particles of magnetite or cobalt ferrite in an aqueous solution containing rare earth element ions to form a dispersion, an alkaline aqueous solution is added to the dispersion to form the hydroxide of the rare earth element over the surfaces of the magnetite or cobalt ferrite particles, and then the particles are recovered by filtration, dried and reduced by heating.

Now, the particle shape of the above magnetic powder is explained from the viewpoint of the dispersion of the powder in the magnetic paint and the properties required to form the thin magnetic layer.

In the case of the conventional acicular magnetic powders, the particle size is decreased to improve the recording properties such as the decrease of noise. As a result, the specific surface area of the particles inevitably increases. Thus, the interaction with the binder increases so that it becomes difficult to obtain a homogeneous dispersion when the magnetic powder is dispersed in the binder. Furthermore, when the magnetic paint dispersion is diluted with a large amount of an organic solvent to apply a thin layer, the magnetic powder particles tend to agglomerate, and therefore the orientation and surface properties deteriorate. Consequently, the particle size of the magnetic powder, which can be used in the production of the coating type magnetic recording media, is limited.

In contrast to the conventional magnetic powders, the magnetic powder of the present invention has the spherical or ellipsoidal shape, and thus it can have a shape close to a sphere having the smallest specific surface area. Therefore, in comparison with the conventional magnetic powders, the magnetic powder of the present invention has a small interaction with the binder and can provide a magnetic paint with good flowability. If the magnetic powder particles are agglomerated, the redispersion of the particles is easy. Thus, the magnetic powder of the present invention can provide the magnetic paint which is particularly suitable for the formation of the thin magnetic layer. As a result, the magnetic powder having the average particle size of about 5 nm can be practically used.

The decrease of the thickness of the magnetic layer is effective to suppress the decrease of the output due to the writing and reading demagnetization, which is the essential problem of the longitudinal recording. Insofar as the acicular magnetic powder having the particle size of about 0.1 μm is used, the thickness of the magnetic layer is limited, because the acicular particles are aligned in the plane direction of the magnetic recording medium on the average by the orientation in the magnetic field, but some particles may be aligned in the direction perpendicular to the plane of the medium since the orientation of the particles has distribution. When such particles are contained, they protrude from the surface of the magnetic layer and deteriorate the surface properties of the medium and may increase noise. Such problems become more serious as the thickness of the magnetic layer decreases. Thus, it is difficult to produce the coated film having a thickness of about 0.3 μm or less and also the smooth surface, insofar as the acicular magnetic powder is used.

When an undercoat layer is provided between the non-magnetic support and the magnetic layer to reduce the thickness of the magnetic layer as explained below, and the undercoat layer is formed by the simultaneous multiple layer coating method in which the magnetic paint for the magnetic layer containing the dispersed acicular magnetic powder is coated over the undercoat layer while the undercoat layer is still wet, the magnetic powder is entrained by the undercoat layer so that the acicular magnetic powder particles tend to penetrate into the undercoat layer at the interface between the magnetic powder and the undercoat layer. Thus, the orientation of the magnetic powder particles is further disturbed, so that the desired squareness is not attained, and the surface smoothness of the magnetic layer deteriorates. Accordingly, the above problem may be one of the causes for a bar to the increase of the recording density by the thin layer coating when the acicular magnetic powder is used.

In contrast to the acicular magnetic powder, the magnetic powder of the present invention has a small particle size and also the spherical or ellipsoidal particle shape and can have the particle shape close to the sphere. Therefore, the powder particles do not protrude from the surface of the magnetic layer. When the undercoat layer is provided, the penetration of the magnetic powder particles into the undercoat layer can be suppressed in contrast with the acicular magnetic powder. Accordingly, the magnetic layer having the extremely smooth surface can be formed.

As the thickness of the magnetic layer decreases, the magnetic flux from the magnetic layer decreases and thus the output decreases. Since the magnetic powder of the present invention has the spherical or ellipsoidal particle shape and can have the particle shape close to the sphere, it has an advantage such that the magnetic powder can be contained in the magnetic layer at a higher filling rate than the acicular magnetic powder and thus the high magnetic flux density can be easily attained.

Furthermore, with respect to the saturation magnetization, in general, the metal or metal alloy magnetic powders have the larger specific surface area as the particle size decreases, so that the ratio of the surface oxide layer which does not contribute to the saturation magnetization increases, while the magnet part contributing to the saturation magnetization decreases. That is, as the particle size decreases, the saturation magnetization decreases. This tendency is remarkable with the acicular magnetic powders, and the saturation magnetization suddenly decreases, when the major axis of the acicular particle is 0.1 μm or less. Such decrease of the saturation magnetization is taken into consideration, when the limit of the usable particle size is determined. Since the magnetic powder of the present invention has the particular or ellipsoidal particle shape, the specific surface area is minimum among the particles having the same volume. Therefore, the magnetic powder of the present invention can maintain the high saturation magnetization in spite of the fine particle.

In the present invention, the particle shape of the rare earth element-iron magnetic powder is expressed by "spherical or ellipsoidal". This intends to include any shape from substantially particulate to the ellipsoid including any intermediate shapes between the particle and the ellipsoid. That is, the above expression is intended to exclude the "acicular" shape of the conventional magnetic powders. Among various shapes, a sphere having the smallest specific surface area to an ellipsoid are preferable. The particle shapes can be observed using an electron microscope like in the measurement of the particle size.

As explained above, the magnetic powder of the present invention has the saturation magnetization, coercive force, particle size and particle shape, all of which are essentially suitable to form the thin magnetic layer, and particularly good writing-reading characteristics can be achieved, when the magnetic recording medium having the magnetic layer with an average thickness of 0.3 μm or less is produced using such a magnetic powder. Among the magnetic powders of the present invention, those having a saturation magnetization of 10 to 25 μWb/g are preferably used to improve the characteristics in the high recording density range in the case of the magnetic recording medium having the magnetic layer with the average thickness of 0.3 μm or less.

Herein, the coercive force and saturation magnetization of the magnetic powder are values, which are measured with a sample-vibration type magnetometer at 25° C. in an applied magnetic field of 1,273.3 kA/m and compensated using a standard sample.

The above magnetic powder of the present invention may be prepared by the following method:

The spherical or ellipsoidal particles of magnetite or cobalt ferrite, which are beforehand prepared, are dispersed in water. To this dispersion, the rare earth ion of, for example, neodymium, samarium, yttrium, etc. is dissolved. The rare earth element ion may be added in the form of a salt of the rare earth element such as a nitrate, etc.

Then, an aqueous solution of an alkaline material is added to the dispersion in a molar amount sufficient for converting the rare earth element ion to a hydroxide. Thereby, the hydroxide of the rare earth element is deposited on the surface of the particles of magnetite or cobalt ferrite. In this step, it is important to adjust the amount of the alkaline material at a molar amount sufficient for converting the rare earth element ion to a hydroxide. When the amount of the alkaline material is too small, the rare earth element ion may not be easily deposited on the surface of the magnetite or cobalt ferrite particles in the form of a hydroxide. When the amount of the alkaline material is too large, the hydroxide of the rare earth element tends to grow so that the surface of the magnetite or cobalt ferrite particles may not be uniformly covered. The hydroxide of the rare earth element is a key material for achieving the high coercive force and also function as a sintering-preventing agent. Therefore, the uniform formation of the hydroxide on the surface of the magnetite or cobalt ferrite particles is very important in the present invention.

Examples of the alkaline material include the hydroxide of alkali metals and alkaline earth metals.

The magnetite or cobalt ferrite particles carrying the hydroxide of the rare earth element are washed with water, recovered by filtration, dried and then reduced by heating to obtain spherical or ellipsoidal magnetic powder particles a having a particle size of 5 to 200 nm, a coercive force of 80 to 400 kA/m and a saturation magnetization of 10 to 25 μWb/g. The final particle size and shape of the magnetic powder obtained are substantially dependent on those of the magnetite or cobalt ferrite particles used as the raw material.

In the method for producing a magnetic powder according to the present invention, what is greatly different from other production method of a magnetic powder is that three properties, namely, the particle shape, the saturation magnetization and the coercive force, which are the most important properties of the magnetic powder, are independently controlled in the production process. That is, the particle size and shape are controlled with those of the magnetite or cobalt ferrite particles used as the raw material, while the saturation magnetization is controlled with the composition of the metal or alloy or the compound, which is obtained after reduction and the degree of oxidizing stabilization treatment after reduction, and the coercive force is controlled with the amount of the rare earth element contained in the magnetic powder.

When iron nitride is used as an iron component, it can be formed by nitriding iron with ammonia gas after reduction by heating. As the ammonia gas, pure ammonia gas may be used, while ammonia gas is mixed with a carrier gas such as nitrogen gas, hydrogen gas, etc.

The primary constituent elements of magnetite or cobalt ferrite are iron, or iron and cobalt. Besides these transition metals, other transition metal ions such as Mn, Zn, Ni, Cu, etc. may be contained in the magnetic powder. These other transition metals are preferably contained in the magnetite or cobalt ferrite particles.

According to the present invention, the core of the magnetic powder particles comprises the metal iron or the iron alloy with the above transition metal(s), or the iron compound, while the rare earth element is present mainly in the outer layer of the magnetic powder particles. Therefore, the content of the rare earth element is from 0.2 to 20 atomic %, preferably from 0.5 to 15 atomic %, more preferably from 1.0 to 10 atomic %, based on the-transition metal. According to the present invention, the intended high coercive force can be attained with such a small amount of the rare earth element.

Hereinafter, a preferred embodiment of a substantially spherical or ellipsoidal rare earth element-iron magnetic powder containing the rare earth element mainly in the outer layer of magnetic powder particles, in which the core comprises the iron compound selected from $Fe_{16}N_2$ and $Fe_{16}N_2$ a part of iron atoms of which are replaced with-other transition metal, will be explained The rare earth element-iron nitride magnetic powder of the present invention comprises substantially spherical or ellipsoidal magnetic powder particles in which the rare earth element is present mainly in the outer layer of the magnetic powder particles. Preferably, such a magnetic powder has an average particle size of 5 to 50 nm, particularly 10 to 50 nm, and an average acicular ratio (an averaged ratio of a longer axis length (diameter) to a shorter axis length (diameter)) of 2 or less, particularly 1.5 or less. The content of the rare earth element is preferably from 0.05 to 20 atomic % based on the ion atoms in the magnetic powder. A BET specific surface area of the particles is preferably from 40 to 100 $m^2/g$.

The above rare earth element-iron nitride magnetic powder can be produced by supplying an oxide or hydroxide of iron as a raw material, coating the particles of the oxide or hydroxide of iron with the rare earth element, reducing them by heating, and then nitriding iron at a temperature lower than the reducing temperature.

In the rare earth element-iron nitride magnetic powder of the present invention, a content of the rare earth element is preferably from 0.05 to 20 atomic %, more preferably from 0.2 to 20 atomic %, particularly preferably from 0.5 to 15 atomic %, most preferably from 1.0 to 0.10 atomic %, based on the amount of iron. The content of nitrogen is preferably from 1.0 to 20 atomic %, more preferably from 1.0 to 12.5 atomic %, particularly preferably from 3 to 12.5 atomic %, based on the amount of iron.

When the content of the rare earth element is too small, the contribution of the rare earth element to the magnetic anisotropy decreases, and large magnetic powder particles tend to form because of sintering in the reducing process so that a particle size distribution may deteriorate. When the content of the rare earth element is too large, the amount of unreacted rare earth element, which does not contribute to the magnetic anisotropy, increases so that the magnetic properties, in particular, the saturation magnetization tend to excessively deteriorate.

When the content of nitrogen is too small, the amount of the $Fe_{16}N_2$ phase decreases so that the coercive force is not increased. When the content of the nitrogen is too large, non-magnetic nitride tends to be formed so that the coercive force is not increased and further the saturation magnetization tends to excessively decrease.

The shape of the rare earth element-iron nitride magnetic powder of the present invention is substantial sphere or ellipsoid having an acicular ratio of 2 or less, in particular, a substantial sphere having an acicular ratio of 1.5 or less. The rare earth element-iron nitride magnetic powder of the present invention has an average particle size of 5 to 50 nm, in particular, 10 to 50 nm. When the particle size is too small, the dispersibility of the magnetic powder tends to deteriorate in the preparation of a magnetic paint. Furthermore, the magnetic powder may become thermally unstable, and the coercive force may change over time. When the particle size is too large, it may increase the noise and also the magnetic layer may not have a smooth surface.

The particle size of the rare earth element-iron nitride magnetic powder is determined by measuring the particle sizes of 300 particles in the transmission electron microscopic photograph taken at a magnification of 200,000 times and averaging the measured particle sizes.

The rare earth element-iron nitride magnetic powder of the present invention preferably has a saturation magnetization of 10 to 20 $\mu Wb/g$, more preferably 11.3 to 19.5 $\mu Wb/g$, particularly preferably 12.6 to 18.2 $\mu Wb/g$, and a coercive force of 119.4 to 318.5 kA/m, more preferably 159.2 to 278.6 kA/m.

The rare earth element-iron magnetic powder of the present invention preferably has a BET specific surface area of 40 to 100 $m^2/g$. When the BET specific surface area is too small, the particle size becomes too large so that the magnetic recording medium comprising such a magnetic powder tend to have a high particle noise and the surface smoothness of the magnetic layer decreases so that the reproducing output tends to decrease. When the BET specific surface area is too large, it is difficult to prepare a uniformly dispersed magnetic paint due to the agglomeration of the magnetic powder particles. When such a magnetic powder is used to produce a magnetic recording medium, the orientation may decrease or the surface smoothness may deteriorate.

As described above, the rare earth element-iron nitride magnetic powder of the present invention has the excellent properties as the magnetic powder for magnetic recording media. In addition, this magnetic powder has good storage stability. Thus, when this magnetic powder or magnetic recording media comprising this magnetic powder is stored under high-temperature high-humidity conditions, it does not suffer from the deterioration of the magnetic properties. Therefore, this magnetic powder is suitable for use in magnetic recording media for high-density recording.

In the case of the rare earth element-iron nitride magnetic powder, the presence of the rare earth element inside the magnetic powder particles is not excluded. In such a case, the magnetic powder particles have a multi-layer structure having an inner layer and an outer layer, and the rare earth element is dominantly present in the outer layer near the surface of the particle. Preferably, at least 50%, more preferably at least 70% of the rare earth element may be contained in the outer layer of the particle. When the magnetic powder has such a structure, the iron phase of the inner layer usually comprises the $Fe_{16}N_2$ phase. However, it is not necessary for the inner layer to consist of the $Fe_{16}N_2$ phase, but the inner layer may comprise a mixture of the $Fe_{16}N_2$ phase and an α-Fe phase. The latter is sometimes advantageous since a desired coercive force can be easily achieved by adjusting the ratio of the $Fe_{16}N_2$ phase to the α-Fe phase.

As described above, the rare earth element may be yttrium, ytterbium, cesium, praseodymium, samarium, lanthanum, europium, neodymium, terbium, etc. Among them, yttrium, samarium or neodymium can greatly increase the coercive force and effectively serves to the maintenance of the particle shape in the reducing step. Thus at least one of yttrium, samarium and neodymium is preferably used.

Together with such a rare earth element, other element such asphosphorus, silicon, aluminum, carbon, calcium, magnesium, etc. may be contained in the magnetic powder. When at least one of silicon and aluminum, which effectively prevent sintering, is used in combination with the rare earth element, a high coercive force is attained.

As described above, the rare earth element-iron nitride magnetic powder may be produced using an oxide or hydroxide of iron (e.g. hematite, magnetite, goethite, etc.) as a raw material. The average particle size of the raw material is selected by taking into consideration the volume change of the particle in the reducing and nitriding steps, and usually from about 5 to 100 nm.

The rare earth element is adhered or deposited on the surface of the raw material particles. Usually, the raw material is dispersed in an aqueous solution of an alkali or an acid. Then, the salt of the rare earth element is dissolved in the solution and the hydroixde or hydrate of the rare earth element is precipitated and deposited on the raw material particles by a neutralization reaction, etc.

The amount of the rare earth element is usually from 0.05 to 20 atomic %, preferably from 0.2 to 20 atomic %, more preferably from 0.5 to 15 atomic %, particularly preferably from 1.0 to 10 atomic %, based on the iron atoms in the magnetic powder.

In addition to the rare earth element, a compound of silicon or aluminum which prevents the sintering of the particles is dissolved in a solvent and the raw material is dipped in the solution so that such an element can be deposited on the raw material particles together with the rare earth element. To effectively carry out the deposition of such an element, an additive such as a reducing agent, a pH-buffer, a particle size-controlling agent, etc. may be mixed in the solution. Silicon or aluminum may be deposited at the same time as or after the deposition of the rare earth element.

Then, the raw material particles on which the rare earth element and optionally other element are deposited are reduced by heating them in the atmosphere of a reducing gas. The kind of the reducing gas is not limited. Usually a hydrogen gas is used, but other reducing gas such as carbon monoxide may be used.

A reducing temperature is preferably from 300 to 600° C. When the reducing temperature is less than 300° C., the reducing reaction may not sufficiently proceed. When the reducing temperature exceeds 600° C., the particles tend to be sintered.

After the reduction of the particles, they are subjected to the nitriding treatment. Thereby, the rare earth element-iron nitride magnetic powder of the present invention is obtained. The nitriding treatment is preferably carried out with a gas containing ammonia. Apart from pure ammonia gas, a mixture of ammonia and a carrier gas (e.g. hydrogen gas, helium gas, nitrogen gas, argon gas, etc.) may be used. The nitrogen gas is preferable since it is inexpensive.

The nitriding temperature is preferably from about 100 to 300° C. When the nitriding temperature is too low, the particles are not sufficiently nitrided so that the coercive force may insufficiently be increased. When the nitriding temperature is too high, the particles are excessively nitrided so that the proportion of $Fe_4N$ and $Fe_3N$ phases increases and thus the coercive force may rather be decreased and the saturation magnetization tends to excessively decrease.

The nitriding conditions are selected so that the content of the nitrogen atoms is usually from 1.0 to 20 atomic %, preferably from 1.0 to 12.5 atomic %, more preferably from 3 to 12.5 atomic %, based on the amount of iron in the rare earth element-iron nitride magnetic powder obtained.

In the magnetic recording medium of the present invention, the magnetic layer is formed by mixing and dispersing the magnetic powder of the present invention, the binder and usually additives such as an abrasive, a dispersant, a lubricant, etc. as well as carbon black in an organic solvent to obtain the magnetic paint, applying the magnetic paint on the non-magnetic support with or without inserting the undercoat layer between them, and drying the applied magnetic paint.

The binder used in the magnetic layer is not limited and may be a combination of a polyurethane resin and at least one resin selected from the group consisting of vinyl chloride resins, vinyl chloride-vinyl acetate copolymer resins, vinyl chloride-vinyl alcohol copolymer resins, vinyl chloride-vinyl acetate-maleic anhydride copolymer resin, vinyl chloride-hydroxyalkyl acrylate copolymer resins and nitrocellulose resins. Among them, the polyurethane resin and the vinyl chloride-hydroxyalkyl acrylate copolymer resin are preferably used in combination. Examples of the polyurethane resin include polyester polyurethane, polyether , polyetherpolyester polyurethane, polycarbonate polyurethane, polyesterpolycarbonate polyurethane, etc.

Preferably, the binder resins have a functional group to improve the dispersibility of the magnetic powder and increase the filling rate of the magnetic powder. Examples of the functional group include —COOM, —SO$_3$M, —OSO$_3$M, —P═O(OM)$_3$, —O—P—O(OM)$_2$ (wherein M is a hydrogen atom, an alkali metal or an amine group), —OH, —NR$_2$, —N'R$_3$ (wherein R is a hydrogen atom or a hydrocarbon group), an epoxy group, etc. When two or more resins are used in combination, they preferably have the same functional group.

The amount of the binder is usually from 5 to 50 wt. parts, preferably from 10 to 35 wt. parts, based on 100 wt. parts of the magnetic powder. In particular, when the vinyl chloride resin is used as the binder, its amount is from 5 to 30 wt. parts, and when the polyurethane resin is used, its amount is from 2 to 20 wt. parts. Most preferably, the vinyl chloride resin and the polyurethane resin are used in combination in the above amounts.

It is preferable to use the binder in combination with a thermally curing crosslinking agent which bonds with the functional group in the binder to crosslink the binder resin. Preferable examples of the crosslinking agent include polyisocyanates such as isocyanates (e.g. tolylenediisocyanate, hexamethylenediisocyanate, isophoronediisocyanate, etc.), reaction products of such isocyanates with a compound having a plurality of hydroxyl groups (e.g. trimethyloipropane, etc.), condensation products of such isocyanates, and the like. The amount of the crosslinking agent is usually from 15 to 70 wt. parts per 100 wt. parts of the binder.

To increase the strength of the magnetic layer, abrasives with high hardness is preferably used. As the abrasive, there may be used materials having a Mohs hardness of at least 6, for example, α-alumina having an aiphatization degree of at least 90%, β-alumina, silicon carbide, chromium oxide, cerium oxide, α-iron oxide, corundum, artificial diamond, silicon nitride, silicon carbide, titanium carbide, titanium oxide, silicon dioxide, boron nitride, and mixtures thereof. Furthermore, complexes of these abrasives (for example, an abrasive the particle surfaces of which are treated with other abrasive) may be used. Among them, alumina particles are preferred, and examples of the commercially available alumina particles are "AKP-10", "AKP-12", "AKP-15", "AKP-30", "AKP-50", "HIT-82" and "HIT-60 (all available from Sumitomo Chemical Co., Ltd.), "UB 40B" (manufactured by Murakami Industries, Ltd.), and the like.

The particle size of the abrasive is preferably from 0.01 to 1 μm. If necessary, abrasives having different particles sizes, or a single abrasive having a particle size distribution may be used to achieve the same effects. The particle shape of the abrasive may be a needle form, a sphere, a cube, etc. and those having a corner in the shape are preferable since the abrasive having such shape has high abrading properties. The amount of the abrasive is usually from 6 to 20 wt. parts, preferably from 8 to 15 wt. parts, per 100 wt. parts of the magnetic powder from the viewpoint of the electromagnetic conversion properties and the contamination of the magnetic head.

Examples of the method for adding the abrasives include a method comprising adding the abrasive directly to the magnetic paint containing the magnetic powder and the binder in the kneading step using a kneader or the pre-mixing step in the course of the preparation of the magnetic paint; a method comprising separately preparing a dispersion containing the abrasive and adding the dispersion to the magnetic paint; etc. The former method, which requires no separate step, is preferably used from the viewpoint of the productivity.

As one of the additives, a surfactant is preferably used as a dispersant. Examples of the surfactant include nonionic surfactants such as alkylene oxide base surfactants, glycerin base surfactants, glycidol base surfactants, alkylphenol-ethylene oxide adducts, etc.; cationic surfactants such as cyclic amines, ester amides, quaternary ammonium salts, hydantoin derivatives, heterocyclic compounds, phosphonium salts, sulfonium salts, etc.; anionic surfactants having an acid group such as a carboxylic acid group, a sulfonic acid group, a phosphoric acid group, a sulfate ester group, aphosphate ester group, etc.; amphoteric surfactants such as amino acids, aminosulfonic acid, sulfate or phosphate esters of aminoalcohols, etc.; and the like.

A further additive contained in the magnetic layer is preferably a lubricant. Examples of the lubricant include known fatty acids, fatty acid esters, fatty acid amides, metal salts of fatty acids, hydrocarbon, and mixtures of two or more of them. Among them, fatty acids having at least 10 carbon atoms, preferably 12 to 24 carbon atoms are preferably used. Such fatty acids partly adhere to the magnetic powder to facilitate the dispersing of the magnetic powder and also soften the contact between the medium and the magnetic head in the initial abrading state to decrease a coefficient of friction. Thus, the fatty acids contribute to the suppression of the head contamination.

The fatty acids may be linear or branched and unsaturated or saturated ones. The linear fatty acids are preferable since they have good lubrication properties. Examples of the linear fatty acids include lauric acid, myristic acid, stearic acid, palmitic acid, oleic acid, isostearic acid, etc.

The amount of the dispersant is preferably from 0.5 to 5 wt. parts, more preferably from 1 to 4 wt. parts, per 100 wt. parts of the magnetic powder. The amount of the lubricant is preferably from 0.2 to 10 wt. parts, more preferably from 0.5 to 5 wt. parts, per 100 wt. parts of the magnetic powder.

To decrease the coefficient of friction of the magnetic layer and prevent the electrostatic charge, carbon black is preferably used. Examples of the carbon black include furnace black for rubbers, thermal black for rubbers, carbon black for coloring, acetylene black, etc. The carbon black preferably has a specific surface area of 5 to 500 $m^2/g$, a DBP oil absorption of 10 to 400 ml/100 g, a particle size of 5 to 300 nm, pH of 2 to 10, a water content of 0.1 to 10 wt. %, and a tap density of 0.1 to 1 g/cc. Examples of the commercially available carbon black are "SEVACARB MTCI" (manufactured by Columbian Carbon), "Thermax Powder N-991" (manufactured by CANCARB), etc.

The amount of the carbon black added is usually 3 wt. % or less based on the magnetic powder.

In the formation of the magnetic layer, any conventionally used organic solvent may be used as the organic solvent which is used in the preparation of the magnetic paint and the lubricant solution. Examples of the organic solvent include aromatic solvents (e.g. benzene, toluene, xylene, etc.), ketone solvents (e.g. acetone, cyclohexanone, methyl ethyl ketone, methyl isobutyl ketone, etc.), acetate solvents (e.g. ethyl acetate, butyl acetate, etc.), carbonate solvents (e.g. dimethyl carbonate, diethyl carbonate, etc.), alcohols (e.g. ethanol, isopropanol, etc.), hexane, tetrahydrofuran, dimethylformamide, and so on.

In the production of the magnetic recording media of the present invention, any known method for the preparation of paints can be used to form the magnetic layer and the undercoat layer which will be described below. In particular, a kneading process using a kneader or the like and a primary dispersing process are preferably used in combination. In the primary dispersion process, a sand mill is preferably used since the dispersibility of the magnetic powder is improved and also the surface properties of the magnetic layer can be controlled.

In the primary dispersing process, zirconia beads having high hardness are preferably used as dispersing media. Examples of the zirconia beads are TORAYCERAM (manufactured by TORAY), ZIRCONIA BALL (manufactured by NIPPON KAGAKU TOGYO), etc. The dispersing time may be suitably adjusted in the range between 30 and 100 minutes in terms of the residence time of the paint.

The magnetic properties of the magnetic layer, which is formed as described above and contains the magnetic powder, the binder and the other components, preferably include a coercive force of from 80 to 400 kA/m, particularly from 95 to 320 kA/m, and a saturated magnetic flux density of from 0.1 to 0.5 T, particularly from 0.2 to 0.4 T.

Herein, the above magnetic properties are measured using a sample-vibration type magnetometer at 25° C. in an external magnetic field of 1273.3 kA/m like in the case of the magnetic powder with a sample prepared by laminating 20 pieces of magnetic recording media and blanking the laminate to a disc of 8 mm in diameter. The measured values are compensated using the standard sample.

As explained in the above, when the magnetic powder of the present invention is used in the production of the magnetic recording media according to the present invention, it does not require such a large saturation magnetization as required by the acicular magnetic powder. When the signals are recorded on the magnetic recording media, the domains of the reversal of magnetization in the media do not contribute to the output. Thus, such domains are preferably made as small as possible. However, with the conventional acicular magnetic powder the coercive force of which is based on the shape magnetic anisotropy, the magnetic interaction among the magnetic powder particles increases as the saturation magnetization increases, and thus a large static magnetic energy is accumulated when the reversal of magnetization is effected quickly. Therefore, the reversal of magnetization should be effected slowly. As a result, the domains of the reversal of magnetization extend. In contrast, the coercive force of the magnetic powder is based on the crystalline magnetic anisotropy, and thus the magnetic interaction among the magnetic powder particles is low. As a result, the reversal of magnetization can be effected quickly. Thus, the domains of the reversal of magnetization are narrowed and the large output can be obtained even with the relatively small saturation magnetization.

According to the magnetic recording media of the present invention, their properties are remarkably exhibited to solve the decrease of the output due to the demagnetization, which is the essential problem of the longitudinal recording, when the magnetic layer is made thin to have the average thickness of 0.3 µm or less. The thickness of the magnetic layer is determined depending on the recording wavelength used. The effects of the present invention can be particularly exhibited when the present invention is applied to the recording system using the shortest recording wavelength of 1.0 µm or less. For example, with the system using the shortest recording wavelength of 0.6 µm such as DLT-4, the average thickness of the magnetic layer is preferably about 0.2 µm, and with the system using the shortest recording wavelength of 0.33 µm such as DDS-3, the average thickness of the magnetic layer is preferably about 0.1 µm. Thus, the present invention is preferably applied to the systems requiring the very thin magnetic layers. Furthermore, it is expected that the magnetic layer would be made very thin, for example, less than 0.1 µm, if the recording wavelength decreases in future. This tendency is remarkable when the magnetization-easy-directions are in the longitudinal direction or randomly distributed. From the viewpoint of practical production, the lower limit of the thickness of the magnetic layer may be preferably 0.01 µm.

The anisotropic magnetic field distribution of the magnetic recording media of the present invention is preferably 0.6 or less in the case of the longitudinally oriented magnetic recording media. When the anisotropic magnetic filed distribution of the magnetic recording media with the longitudinal orientation is 0.6 or less, the dispersibility and orientation properties of the fine particles of the magnetic powder according to the present invention are improved, so that the output at the short wavelength is increased and the error rate is improved even when the coercive force is the same.

In general, the value of the anisotropic magnetic filed distribution decreases as the orientation properties of the magnetic powder increases, since the former depends on the latter. However, the magnetic powder of the present invention exhibits the good anisotropic magnetic filed distribution even at random distribution, since it has the better particle size distribution than the conventional acicular magnetic powder.

When the magnetic recording media of the present invention are used in the high density recording systems with the shortest recording wavelength of 1.0 µm or less, a P-V value (in terms of the optical interference type three-dimensional surface roughness) is preferably 50 nm or less, more preferably 40 nm or less, to achieve the high output. That is, with the conventional acicular magnetic powder, when the magnetic recording media are produced to have a multiple layer-structure having the undercoat layer to decrease the thickness of the magnetic layer, the magnetic powder particles tend to penetrate in the undercoat layer in comparison with the direct application of the magnetic layer on the non-magnetic support. Therefore, the magnetic powder particles are not aligned in parallel with the surface of the magnetic layer, so that the surface properties including surface smoothness tends to deteriorate. However, since the magnetic powder particles of the present invention have the spherical or ellipsoidal shape, they do not deteriorate the surface properties in the course of the orientation. In addition, although the magnetic powder of the present invention consists of very fine particles having an average particle size of 5 to 200 nm, it hardly agglomerates, and thus it has good dispersibility. As a result, the magnetic powder of the present invention can improve the surface smoothness of the magnetic layer and achieve the high output in cooperation with the above-described high coercive force, even when the shortest recording wavelength is 1.0 µm or less.

Herein, the surface roughness is measured using a non-contact type surface roughness meter TOPO-3D (manufactured by WYKO) to which an object head (magnification of 40 times) is attached, at a measuring wavelength of 648.9 nm and a measuring area of 250 µm×250 µm with the curvatures and cylindrical corrections. The surface roughness is measured 4 times at each measuring point and the measured values are averaged to obtain the surface roughness (P-V) at each point, and the surface roughness values at 10 measuring points are again averaged.

Since the magnetic recording medium should be in contact with the magnetic head with the medium being wound around the cylinder in the helical scanning system, the strength of the magnetic recording medium in the machine direction and the transverse direction should be optimized to increase the head contact of the medium. Quite recently, in the helical scanning system, the tip of the magnetic head is shaped to have an acute angle so that the amount of indentation in the magnetic layer increases, and the system is designed so that the relative speed of the magnetic tape and the magnetic head is very high. Therefore, the deterioration of the head contact leads to the deterioration of an envelope. From such a viewpoint, to improve the head contact of the medium against the magnetic head, a ratio of a Young's modulus in the transverse direction ($Y_{TD}$) to that ($Y_{MD}$) in the machine direction of the medium ($Y_{TD}/Y_{MD}$) is preferably from 1.0 to 1.7. Since the conventional magnetic powder particles have the needle-form shape, they are oriented so that the major axes are in parallel with the plane of the magnetic layer by the mechanical orientation step when the magnetic paint is applied. In addition, they are oriented in the magnetic field in the machine direction to attain the high squareness. Thus, the major axes of the particles are further aligned in the machine direction. Therefore, the strength of the magnetic layer in the machine direction is inevitably stronger than that in the transverse direction, and the head contact against the magnetic head, which is desired to be isotropic, deteriorates. In contrast, since the magnetic recording media of the present invention use the magnetic powder particles having the spherical or ellipsoidal shape, the magnetic powder particles are hardly mechanically oriented in the course of the application of the magnetic paint in comparison with the acicular magnetic powder, and they are less oriented in parallel with the plane of the magnetic layer. As a result, the strength of the magnetic recording media in the transverse direction can be increased. Thus, the above ratio ($Y_{TD}/Y_{MD}$) is preferably from 1.2 to 1.6.

Herein, the Young's modulus is measured with 0.3% elongation at 25° C., 60% RH.

When the magnetic layer is made thin in the present invention, a least one undercoat layer is preferably provided between the non-magnetic support and the magnetic layer so that the good surface smoothness resulting from the particle shape of the magnetic powder can be attained readily. Since the specific magnetic powder used in the present invention can provide the magnetic paint with good flowability so that the leveling of the applied paint is improved and thus the formed magnetic layer has good surface smoothness. When the undercoat layer having the similar coating properties to those of the magnetic paint is provided, the leveling of the applied magnetic paint is improved in comparison to the direct application of the magnetic paint to the non-magnetic support, and also the influence of the surface conditions of the non-magnetic support on the surface properties of the magnetic layer can be suppressed.

The undercoat layer may contain inorganic powder, a binder, a lubricant, carbon black, and so on. The inorganic powder is preferably a non-magnetic powder, but a magnetic powder may be used in special applications.

Examples of the non-magnetic powder include β-alumina having an alphatization degree of at least 90%, β-alumina, γ-alumina, α-iron oxide, $TiO_2$ (rutile or anatase type), TiOx, cerium oxide, tin oxide, tungsten oxide, ZnO, $ZrO_2$, $SiO_2$, $Cr_2O_3$, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, titanium carbide, and mixtures thereof. Examples of the magnetic powder include γ-$Fe_2O_3$, cobalt-containing γ-$Fe_2O_3$, Fe alloys, $CrO_2$, barium ferrite, etc.

The inorganic powders may have spherical, acicular or platelet shapes. The particle size of the inorganic powder preferably do not exceed 0.5 μm, since the inorganic powder having the too large particle size deteriorates the surface properties of the undercoat layer and in turn influences the surface properties of the magnetic layer. When the particle size of the inorganic powder is too small, the filling rate of the inorganic powder in the undercoat layer increases so that the volume of vacancies which retain the lubricant decreases and also the cushioning effects deteriorate. Thus, the particle size of the inorganic powder is preferably at least 0.05 μm. In the case of acicular non-magnetic powder, it usually has a major (longer) axis length of 0.05 to 0.5 μm and an acicular ratio of 3 to 20. In the case of spherical non-magnetic powder, it usually has a particle size of 0.05 to 0.3 μm.

The amount of the inorganic powder used is preferably from 60 to 90 wt. %, particularly from 70 to 80 wt. % for the same reasons as described above in connection with the particle size.

The binder used in the undercoat layer may be the resin as that used in the formation of the magnetic layer, and is preferably the same kind resin as that contained in the magnetic layer. In particular, when the same combination of the vinyl chloride resin and the polyurethane resin is used in the magnetic layer and the undercoat layer, the elasticities of the both layers are close so that the load from the magnetic head can be scattered in the both layers.

The binder in the undercoat layer preferably has the same functional group(s) as that of the binder in the magnetic layer. In particular, in the combination of the vinyl chloride resin and the polyurethane resin, the resins in the undercoat layer and those in the magnetic layer preferably have the same functional groups, since the adhesion between the two layer is increased, and furthermore the exudation of the lubricant from the undercoat layer to the magnetic layer is facilitated.

The amount of the binder in the undercoat layer is preferably from 20 to 45 wt. parts, particularly from 25 to 40 wt. parts, per 100 wt. parts of the inorganic powder.

Furthermore, it is preferable to use a thermally curing crosslinking agent, which crosslinks the binder through the bonding of the functional groups of the binder, like in the case of the magnetic layer. The amount of the crosslinking agent is preferably from 15 to 70 wt. parts per 100 wt. parts of the binder.

Also, the same lubricant as one used in the magnetic layer can be used in the undercoat layer, but it is preferable to use the fatty acid ester only, or the mixture of the fatty acid and the fatty acid ester having the increased ratio of the fatty acid ester, since the fatty acid is less exuded in the upper magnetic layer than the fatty acid ester. The amount of the lubricant added to the undercoat layer is usually from 0.5 to 12 wt. parts, preferably from 1 to 10 wt. parts, more preferably from 2 to 10 wt. parts, per 100 wt. parts of the inorganic powder. The weight ratio of the fatty acid to the fatty acid ester added to the undercoat layer is preferably from 0:100 to 40:60, particularly from 0:100 to 30:70.

To add the lubricant to the undercoat layer, the lubricant is added to a paint for the undercoat layer before, during or after mixing with a kneader and the like, or the solution of the lubricant is applied or spray coated to the surface of the already formed undercoat layer.

As the carbon black used in the undercoat layer, a combination of carbon black having a particle size of 0.01 to 0.03 μm and carbon black having particle size of 0.05 to 0.3 μm is preferably used. The former carbon black is used to maintain the electrical conductivity and retain the vacancies which keep the lubricant like in the case of the magnetic layer, while the latter carbon black copes with both the increase of the film strength of the undercoat layer and the cushioning effects. The amount of carbon black added to the undercoat layer in total is preferably from 5 to 70 wt. parts, particularly from 15 to 40 wt. parts, per 100 wt. parts of the inorganic powder.

Examples of the carbon black having a particle size of 0.01 to 0.03 μm include "BLACK PEARLS 800", "Mogul-L", "VULCAN XC-72", "Regel 660R" (all available from Cabot); "Raven 1255" and "Conductex SC" (both available from Columbian Carbon); etc. Examples of the carbon black having particle size of 0.05 to 0.3 μm include "BLACK PEARLS 130" and "Monarch 120" (both available from Cabot); "Raven 450" and "Raven 410" (both available from Columbian Carbon); "Termax Powder N-991" (available from CANCARB); etc.

As the solvents used to prepare the paint for the undercoat layer or the lubricant solution in the formation of the undercoat layer, organic solvents such as aromatic solvents, ketone solvents, ester solvents, alcohols, hexane, tetrahydrofuran, and so on may be used like in the formation of the magnetic layer.

The average thickness of the undercoat layer is preferably from 0.5 to 10 µm, more preferably from 1 to 5 µm. The average thickness of the undercoat layer is preferably 1.7 to 200 times, more preferably 2 to 50 times larger than the average thickness of the magnetic layer.

Herein, the average thickness of the magnetic layer or the undercoat layer is obtained by cutting the magnetic recording medium with a microtome, taking a transmission electron microscopic photograph of the cross section of the cut medium (magnification: 50,000 times), measuring the thickness of the magnetic layer or the undercoat layer at ten points with an interval of 1 cm, repeating this measurement at five different parts and averaging the fifty (10×5) measured values.

In the present invention, the non-magnetic support may be any one of those conventionally used in the magnetic recording media. Specific examples of the support are plastic films of polyesters (e.g. polyethylene terephthalate, polyethylene naphthalate, etc.), polyolefin, cellulose triacetate, polycarbonate, polysulfone, polyamides (e.g. polyamide, polyimide, polyamideimide, aramide, aromatic polyamide, etc.), and the like. The non-magnetic support has a thickness of 2 to 100 µm. Among the non-magnetic supports, the polyester film or the polyamide film with the improved strength in the transverse direction is preferably used, which has a Young's modulus of at least $5.0 \times 10^9$ N/m$^2$, preferably $6.0 \times 10^9$ N/m$^2$ to $22.0 \ 10^9$ N/m$^2$ in the transverse direction at an elongation of 0.3%, to improve the head contact with the magnetic head when the total thickness of the medium is reduced for the purpose of the high density recording.

It is preferable to use a non-magnetic support having different surface roughness on both surfaces when a back coat layer is formed on the surface of the support opposite to the magnetic layer. The difference of the surface properties makes it easy to control the P-V value of the magnetic layer.

The non-magnetic support may have a resin layer on its surface to improve the adhesion to the undercoat layer. Examples of the resin of the resin layer include polyester resins, polyurethane resins, etc. Among them, the resins, having functional groups such as —COOM, —SO$_3$M, —OSO$_3$M, —P=O(OM)$_3$, —O—P=O (OM)$_2$ (wherein M is a hydrogen atom, an alkali metal or an amine group) are preferable, since they have good adhesion to the non-magnetic support and improve the adhesion to the undercoat layer. The resin layer may contain an inorganic powder such as silica to prevent blocking. The thickness of the resin layer is preferably 0.1 µm or less, particularly from 0.01 to 0.08 µm.

When the non-magnetic support has the large anisotropy of shrinkage which is generated in a service atmosphere, in particular a high temperature atmosphere, the followability deteriorates and thus the tracking errors tend to occur. Therefore, the non-magnetic support preferably has a thermal shrinkage of 1.5% or less in the machine direction and 1.0% or less in the transverse direction at 105° C., 30 minutes, that is, when the thermal shrinkage is measured by heating the support at 105° C. for 30 minutes and then cooling it. In detail, the thermal shrinkage is measured as follows:

Six samples each having a width of 10 mm and a length of 300 mm are collected from the non-magnetic support in the machine direction or the transverse direction and heated at 105° C. for 30 minutes in a hot air followed by cooling. The length of each sample is measured, and the thermal shrinkage is calculated according to the following equation:

Thermal shrinkage (%)=[(Original length−Length after shrink)/ Original length]×100 Then the calculated thermal shrinkage values of six samples are averaged.

In the application steps to form the undercoat layer and the magnetic layer on the non-magnetic support according to the present invention, any conventional application methods such as gravure coating, roll coating, blade coating, extrusion coating, etc. may be used. The application method of the undercoat layer and the magnetic layer maybe the sequential multiple layer coating method in which the magnetic paint of the magnetic layer is applied on the undercoat layer which has been applied on the non-magnetic support and dried, or the simultaneous multiple layer coating method in which the undercoat layer and the magnetic layer are applied at the same time. In view of the leveling of the thin magnetic layer in the course of the application, the simultaneous multiple layer coating method, which applies the paint for the magnetic layer while the undercoat layer is still wet, is preferably used. The present invention is particularly effective in the simultaneous multiple layer coating method, since in the simultaneous multiple layer coating method which applies the magnetic layer while the undercoat layer is still wet, the interface between the undercoat layer and the magnetic layer is disturbed and the magnetic powder particles tend to penetrate in the undercoat layer so that the surface properties of the magnetic layer tend to deteriorate.

The magnetic recording media of the present invention may have a back coat layer-on the surface of the non-magnetic support opposite to the magnetic layer. Besides conductive carbon black, the back coat layer may contain inorganic non-magnetic powder which is known as an abrasive to decrease the coefficient of friction and to increase the mechanical strength. Examples of such non-magnetic powder include α-Fe$_2$O$_3$, Fe$_3$O$_4$, TiO$_2$, graphite, CaO, SiO$_2$, Cr$_2$O$_3$, α-Al$_2$O$_3$, SiC, CaCO$_3$, BaSO$_4$, ZnO, MgO, boron nitride, TiC, ZnS, MgCO$_3$, SnO$_3$, etc. If desired, the back coat may further contain lubricants such as higher fatty acids, fatty acid esters, silicone oils, etc.; dispersants such as surfactants; and other additives.

The binders of the back coat layer may be the same as those used in the magnetic layer. Among them, the combination of the cellulose resin and the polyurethane is preferable.

The amount of the binder used is preferably from about 15 to 200 wt. parts per 100 wt. parts of the carbon black and the inorganic non-magnetic powder. To cure the binder, a crosslinking agent such as poyisocyante may be used in combination with the binder.

The average thickness of the back coat layer is preferably from about 0.3 to 1.0 µm after calendering. When the thickness of the back coat layer is too large, the total thickness of the magnetic recording medium becomes too large. When the thickness of the back coat layer is too small, the surface properties of the back coat layer deteriorate by the influence of the surface properties of the non-magnetic support so that the surface conditions of the back coat layer are transferred to the magnetic layer surface and thus the electromagnetic conversion characteristics, etc. may deteriorate.

In the production of the magnetic recording media of the present invention, the surface of the magnetic layer is preferably treated by calendering with plastic rolls or metal rolls, for example, five metal rolls. The calendering can adjust the P-V value of the surface of the magnetic layer. In addition, the filling rate of the magnetic powder can be increased to increase the residual magnetic flux density. A calendering temperature is preferably at least 60° C., particularly from 80 to 200° C. A linear pressure is preferably at least 115 kN/m, particularly from 150 to 400 kN/m, and a calendering speed is preferably from 20 to 700 m/min. In particular, the above effects can be enhanced when the calendering is carried out at a temperature of at least 80° C. under a linear pressure of at least 190 kN/m.

In the production of the magnetic recording media of the present invention, the media are aged after the above calendering. The aging can promote the curing of the coated film and improve the film strength. The aging is preferably carried out at a temperature of 70° C. or less, since when the aging temperature is too high, the winding constriction of the magnetic sheet becomes too high so that the surface roughness of the back coat layer is transferred to the magnetic layer and thus the surface properties of the magnetic layer tend to deteriorate. To adjust the wetness, the aging is preferably carried out under a humidity of 5 to 60% RH.

Furthermore, it is preferable to abrade the surface of the magnetic layer after drying to remove dusts causing dropouts from the surface of the magnetic surface and also the vulnerable parts of the surface of the magnetic layer, and to adjust the surface properties of the magnetic layer. The abrading treatment may be carried out with a blade or an abrasive wheel. From the viewpoint of the productivity, the treatment with the abrasive wheel is preferable. The treatment with the abrasive wheel is described in, for example, JP-A-62-150519, JP-A-62-172532, JPA-A-2-23521, etc. As a material used to form the abrading part of the wheel, ceramics, super steel, sapphire, diamond, and the like may be exemplified. When the abrasive wheel is used, the peripheral speed of the wheel is preferably ±200% of the tape running speed (50 to 300 m/min.), and an winding angle of the tape around the wheel is preferably from 10 to 80 degrees.

EXAMPLES

The present invention will be illustrated by the following Examples, in which "parts" mean "parts by weight" unless otherwise indicated.

Preparation of Magnetic Powder (Examples 1–14 and Comparative Examples 1–2)

Example 1

Cobalt nitrate hexahydrate (0.419 mole) and iron(III) nitrate nonahydrate (0.974 mole) were dissolved in water (1500 ml). Separately, sodium hydroxide (3.76 moles) was dissolved an water (1500 g). The latter solution of sodium hydroxide was added to the former solution of the nitrates and the mixture was stirred for 20 minutes to coprecipitate iron and cobalt.

The coprecipitated material was placed in an autoclave and heated at 220° C. for 4 hours. After hydrothermal treatment, the precipitate was washed with water to obtain spherical or ellipsoidal cobalt ferrite particles having a particle size of 15 nm.

Then, the cobalt ferrite particles (20 g) were suspended in water (200 g). To the suspension, samarium nitrate hexahydrate (0.00726 mole) was added and dissolved followed by stirring for 20 minutes. Furthermore, a solution of sodium hydroxide (0.02178 mole) in water (10 g) was added to the suspension and stirred for 20 minutes.

The suspension was heated at 90° C. for 1 hour, washed with water and filtrated. The filtrated material was spread in a vat and dried at 60° C. for 6 hours to remove moisture.

The resulting oxide was ground with a mortar, placed in a tubular electric furnace and heated in a hydrogen stream at 500° C. for 1 hour to reduce the oxide. The reduced material was cooled to room temperature while flowing the hydrogen gas and then the gas was switched to a nitrogen gas containing 1000 ppm of oxygen. Thereafter, the temperature was raised to 100° C. and the material was stabilized for 6 hours in the same oxygen-containing nitrogen gas stream. After cooling, the material was recovered in an air.

According to an X-ray fluorescent analysis, the obtained samarium-containing iron-cobalt magnetic powder contained 5.6 atomic % of samarium based on the total of the transition metals (iron and cobalt), and the atomic ratio of cobalt to iron was 29:71.

The obtained magnetic powder was observed with a transmission electron microscope (magnification: 300,000 times) The electron microscopic photograph is shown in FIG. 1. The powder consisted of substantially spherical or ellipsoidal particles having a particle size of 15 nm.

The magnetic powder had a saturation magnetization of 21.6 $\mu$Wb/g and a coercive force of 125.7 kA/m when measured with applying a magnetic field of 16 kOe.

Example 2

A samarium-containing iron-cobalt magnetic powder was produced in the same manner as in Example 1 except that cobalt ferrite particles were prepared by changing the hydrothermal treatment conditions to 180° C. and 4 hours to obtain cobalt ferrite particles having a particle size of 10 nm.

According to an X-ray fluorescent analysis, the obtained samarium-containing iron-cobalt magnetic powder contained 5.7 atomic % of samarium based on the total of the transition metals (iron and cobalt), and the atomic ratio of cobalt to iron was 30:70.

The obtained magnetic powder was observed with a transmission electron microscope. The powder consisted of substantially spherical or ellipsoidal particles having a particle size of 10 nm.

The magnetic powder had a saturation magnetization of 20.6 $\mu$Wb/g and a coercive force of 136.1 kA/m when measured with applying a magnetic field of 16 kOe.

Example 3

A samarium-containing iron-cobalt magnetic powder was produced in the same manner as in Example 1 except that cobalt ferrite particles were prepared by changing the hydrothermal treatment conditions to 260° C. and 4 hours to obtain cobalt ferrite particles having a particle size of 20 nm.

According to an X-ray fluorescent analysis, the obtained samarium-containing iron-cobalt magnetic powder contained 5.4 atomic % of samarium based on the total of the transition metals (iron and cobalt), and the atomic ratio of cobalt to iron was 29:71.

The obtained magnetic powder was observed with a transmission electron microscope. The powder consisted of substantially spherical or ellipsoidal particles having a particle size of 20 nm.

The magnetic powder had a saturation magnetization of 21.9 $\mu$Wb/g and a coercive force of 123.3 kA/m when measured with applying a magnetic field of 16 kOe.

Example 4

A samarium-containing iron-cobalt magnetic powder was produced in the same manner as in Example 1 except that the cobalt ferrite particles prepared in Example 1 (10 g) was suspended in water (200 g), samarium nitrate hexahydrate (0.0118 mole) was added to and dissolved in the suspension followed by stirring for 20 minutes, and then, a solution of sodium hydroxide (0.0354 mole) in water (10 g) was added to the suspension and stirred for 20 minutes.

According to an X-ray fluorescent analysis, the obtained samarium-containing iron-cobalt magnetic powder contained 9.4 atomic % of samarium based on the total of the transition metals (iron and cobalt), and the atomic ratio of cobalt to iron was 28:72.

The obtained magnetic powder was observed with a transmission electron microscope. The powder consisted of substantially spherical or ellipsoidal particles having a particle size of 15 µm.

The magnetic powder had a saturation magnetization of 20.3 µWb/g and a coercive force of 138.5 kA/m when measured with applying a magnetic field of 16 kOe.

Example 5

A neodymium-containing iron-cobalt magnetic powder was produced in the same manner as in Example 1 except that the cobalt ferrite particles prepared in Example 1 (10 g) was suspended in water (200 g), neodymium nitrate hexahydrate (0.00726 mole) was added to and dissolved in the suspension followed by stirring for 20 minutes, and then, a solution of sodium hydroxide (0.02178 mole) in water (10 g) was added to the suspension and stirred for 20 minutes.

According to an X-ray fluorescent analysis, the obtained neodymium-containing iron-cobalt magnetic powder contained 5.5 atomic % of neodymium based on the total of the transition metals (iron and cobalt), and the atomic ratio of cobalt to iron was 29:71.

The obtained magnetic powder was observed with a transmission electron microscope. The powder consisted of substantially spherical or ellipsoidal particles having a particle size of 15 nm.

The magnetic powder had a saturation magnetization of 21.5 µWb/g and a coercive force of 124.1 kA/m when measured with applying a magnetic field of 16 kOe.

Example 6

An yttrium-containing iron-cobalt magnetic powder was produced in the same manner as in Example 1 except that the cobalt ferrite particles prepared in Example 1 (10 g) was suspended in water (200 g), yttrium nitrate hexahydrate (0.00726 mole) was added to and dissolved in the suspension followed by stirring for 20 minutes, and furthermore, a solution of sodium hydroxide (0.02178 mole) in water (10 g) was added to the suspension and stirred for 20 minutes.

According to an X-ray fluorescent analysis, the obtained yttrium-containing iron-cobalt magnetic powder contained 5.6 atomic % of yttrium based on the total of the transition metals (iron and cobalt), and the atomic ratio of cobalt to iron was 28:72.

The obtained magnetic powder was observed with a transmission electron microscope. The powder consisted of substantially spherical or ellipsoidal particles having a particle size of 15 nm.

The magnetic powder had a saturation magnetization of 21.9 µWb/g and a coercive force of 120.2 kA/m when measured with applying a magnetic field of 16 kOe.

Example 7

A samarium/yttrium-containing iron-cobalt magnetic powder was produced in the same manner as in Example 1 except that samarium nitrate hexahydrate (0.00508 mole) and yttrium nitrate hexahydrate (0.00218 mole) were added to and dissolved in the suspension of cobalt ferrite particles prepared in Example 1 (10 g) in water (200 g).

According to an X-ray fluorescent analysis, the obtained samarium/yttrium-containing iron-cobalt magnetic powder contained 3.8 atomic % of samarium and 1.6 atomic % of yttrium based on the total of the transition metals (iron and cobalt), and the atomic ratio of cobalt to iron was 28:72.

The obtained magnetic powder was observed with a transmission electron microscope. The powder consisted of substantially spherical or ellipsoidal particles having a particle size of 15 nm.

The magnetic powder had a saturation magnetization of 21.5 µWb/g and a coercive force of 124.9 kA/m when measured with applying a magnetic field of 16 kOe.

Example 8

Spherical or ellipsoidal cobalt ferrite particles were prepared in the same manner as in Example 1 except that the amounts of cobalt nitrate hexahydrate and iron(III) nitrate nonahydrate were changed to 0.182 mole and 1.211 mole, respectively, and the amount of sodium hydroxide was changed to 4.00 moles. The cobalt ferrite particles had a particle size of 18 nm.

Then, a samarium-containing iron-cobalt magnetic powder was produced in the same manner as in Example 1 except that the above cobalt ferrite particles (10 g) was suspended in water (200 g), samarium nitrate hexahydrate (0.00726 mole) was added to and dissolved in the suspension followed by stirring for 20 minutes, and then, a solution of sodium hydroxide (0.02178 mole) in water (10 g) was added to the suspension and stirred for 20 minutes.

According to an X-ray fluorescent analysis, the obtained samarium-containing iron-cobalt magnetic powder contained 5.6 atomic % of samarium based on the total of the transition metals (iron and cobalt), and the atomic ratio of cobalt to iron was 13:87.

The obtained magnetic powder was observed with a transmission electron microscope. The powder consisted of substantially spherical or ellipsoidal particles having a particle size of 18 nm.

The magnetic powder had a saturation magnetization of 21.0 µWb/g and a coercive force of 120.2 kA/m when measured with applying a magnetic field of 16 kOe.

Example 9

A samarium-containing iron-cobalt magnetic powder was produced in the same manner as in Example 1 except that the cobalt ferrite particles prepared in Example 1 (10 g) was suspended in water (200 g), samarium nitrate hexahydrate (0.00223 mole) was added to and dissolved in the suspension followed by stirring for 20 minutes, and furthermore, a solution of sodium hydroxide (0.0067 mole) in water (10 g) was added to the suspension and stirred for 20 minutes.

According to an X-ray fluorescent analysis, the obtained samarium-containing iron-cobalt magnetic powder contained 1.7 atomic % of samarium based on the total of the transition metals (iron and cobalt), and the atomic ratio of cobalt to iron was 29:71.

The obtained magnetic powder was observed with a transmission electron microscope. The powder consisted of substantially spherical or ellipsoidal particles having a particle size of 15 nm.

The magnetic powder had a saturation magnetization of 22.7 μWb/g and a coercive force of 102.7 kA/m when measured with applying a magnetic field of 16 kOe.

Example 10

Cobalt ferrite particles were prepared in the same manner as in Example 1 except that the amounts of cobalt nitrate and iron(III) nitrate were used in the same amounts but the amount of sodium hydroxide was changed from 3.76 moles to 5.64 moles, and the hydrothermal treatment conditions were changed to 280° C. and 4 hours. The cobalt ferrite particles had a particle size of 35 nm.

Then, a samarium-containing iron-cobalt magnetic powder was produced in the same manner as in Example 1 except that the above cobalt ferrite particles (10 g) was suspended in water (200 g).

According to an X-ray fluorescent analysis, the obtained samarium-containing iron-cobalt magnetic powder contained 5.1 atomic % of samarium based on the total of the transition metals (iron and cobalt), and the atomic ratio of cobalt to iron was 28:72.

The obtained magnetic powder was observed with a transmission electron microscope. The powder consisted of substantially spherical or ellipsoidal particles having a particle size of 35 nm.

The magnetic powder had a saturation magnetization of 22.4 μWb/g and a coercive force of 104.2 kA/m when measured with applying a magnetic field of 16 kOe.

Example 11

Iron(II) sulfate heptahydrate (0.419 mole) and iron(III) nitrate nonahydrate. (0.974 mole) were dissolved in water (1500 g). Separately, sodium hydroxide (3.76 moles) was dissolved in water (1500 g). Then, the aqueous solution of sodium hydroxide was added to the solution of the iron salts and stirred for 20 minutes to grow magnetite particles.

The magnetite particles were placed in an autoclave and heated at 180° C. for 4 hours. After hydrothermal treatment, the particles were washed with water to obtain spherical or ellipsoidal magnetite particles having a particle size of 20 nm.

Then, the magnetite particles (10 g) were suspended in water (200 g). In the same manner as in Example 6, yttrium nitrate hexahydrate (0.00726 mole) was added to and dissolved in this suspension followed by stirring for 20 minutes. Furthermore, a solution of sodium hydroxide (0.02178 mole) in water (10 g) was added to the suspension and stirred for 20 minutes.

The resulting oxide was ground with a mortar, placed in a tubular electric furnace and heated in a hydrogen stream at 450° C. for 1 hour to reduce the oxide. The reduced material was cooled to room temperature while flowing the hydrogen gas, and then the gas was switched to a nitrogen gas containing 1000 ppm of oxygen. Thereafter, the temperature was raised to 100° C. and the material was stabilized for 6 hours in the same oxygen-containing nitrogen gas. After cooling, the yttrium-containing iron magnetic powder was recovered in an air.

According to an X-ray fluorescent analysis, the obtained yttrium-containing iron magnetic powder contained 5.5 atomic % of yttrium based on the iron.

The obtained magnetic powder was observed with a transmission electron microscope. The powder consisted of spherical or ellipsoidal particles having a particle size of 15 nm.

The magnetic powder had a saturation magnetization of 19.1 μWb/g and a coercive force of. 102.8 kA/m when measured with applying a magnetic field of 16 kOe.

Example 12

In the process of Example 11, after the reduction in the hydrogen gas stream at 450° C. for 1 hour, the reduced particles were cooled to 150° C. while flowing the hydrogen gas, and then nitrided in an ammonia gas at 150° C. for 30 hours. Thereafter, the temperature was further lowered to 100° C. After switching the gas to a nitrogen gas containing 1000 ppm of oxygen, the particles were stabilized for 6 hours. Then, the particles were cooled to room temperature while flowing the same oxygen-containing nitrogen gas and recovered in the air.

According to the X-ray fluorescent analysis, the obtained magnetic powder contained 5.5 atomic % of yttrium based on iron.

Figure 2:
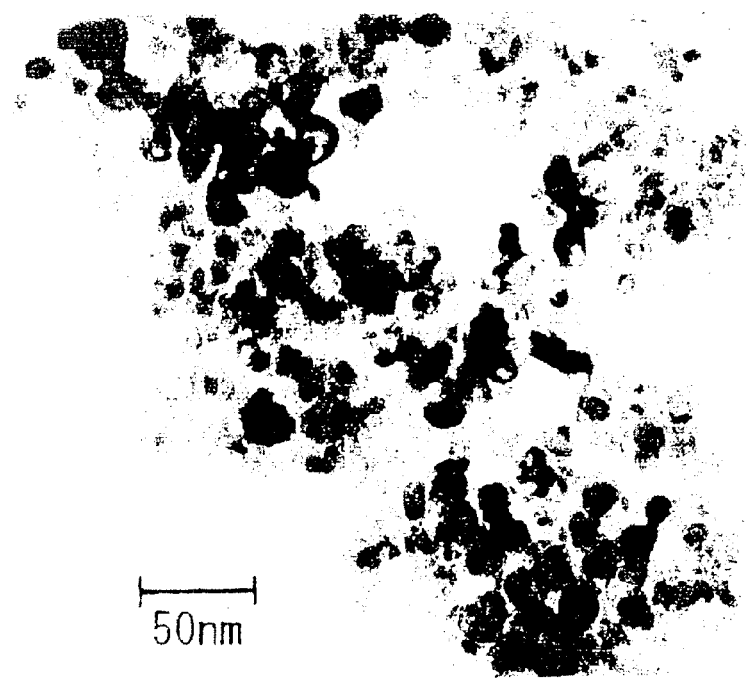
FIG. 2 is a transmission electron microscopic photograph (magnification: 300,000 times) of the yttrium-iron nitride magnetic powder, which is produced in Example 12.

The obtained magnetic powder was observed with a transmission electron microscope. FIG. 2 shows the transmission electron microscopic photograph of this magnetic powder (magnification: 300,000 times). The powder consisted of substantially spherical or ellipsoidal having an average particle size of 15 nm.

The X-ray diffraction analysis of the magnetic powder confirmed that it had a mixed phase of iron nitride having the structure of $Fe_{16}N_2$ and the α-Fe phase.

The magnetic powder had a saturation magnetization of 15.1 μWb/g (120.2 emu/g) and a coercive force of 210.9 kA/m (2650 Oe) when measured with applying a magnetic field of 16 kOe.

Comparative Example 1

The cobalt ferrite particles synthesized in Example 1 were reduced under the same conditions as those in Example 1 except that no rare earth element was added, and then stabilized to obtain an iron-cobalt magnetic powder.

This magnetic powder was observed with a transmission electron microscope. The particles were apparently agglomerated by sintering, and the particle sizes widely distributed from about 20 nm to about 300 nm (0.3 μm).

The magnetic powder had a saturation magnetization of 24.4 μWb/g and a coercive force of 9.5 kA/m when measured with applying a magnetic field of 16 kOe.

Comparative Example 2

The cobalt ferrite particles synthesized in Example 8 were reduced under the same conditions as those in Example 1 except that no rare earth element was added, and then stabilized to obtain an iron-cobalt magnetic powder.

This magnetic powder was observed with a transmission electron microscope. The particles were apparently agglomerated by sintering, and the particle sizes widely distributed from about 20 nm to about 500 nm (0.5 μm).

The magnetic powder had a saturation magnetization of 23.9 μWb/g and a coercive force of 7.2 kA/m when measured with applying a magnetic field of 16 kOe.

Example 13

The magnetite particles prepared in Example 11 (10 g) was suspended in water (200 g). Then, samarium nitrate hexahydrate (0.00726 mole) was added to and dissolved in the suspension followed by stirring for 20 minutes, and furthermore, a solution of sodium hydroxide (0.02178 mole)

in water (10 g) was added to the suspension and stirred for 20 minutes. Thereafter, the oxide was ground with a mortar, and reduced and stabilized in the same manners as those in Example 11 to obtain a samarium-containing iron magnetic powder.

According to an X-ray fluorescent analysis, the obtained samarium-containing iron magnetic powder contained 5.6 atomic % of samarium based on the iron.

The obtained magnetic powder was observed with a transmission electron microscope. The powder consisted of substantially spherical or ellipsoidal particles having a particle size of 15 nm.

The magnetic powder had a saturation magnetization of 15.5 $\mu$Wb/g (123.4 emu/g) and a coercive force of 208.5 kA/m (2620 Oe) when measured with applying a magnetic field of 16 kOe.

Table 1 summarizes the contents of rare earth metal elements based on the transition metal(s) (iron+cobalt, or iron), the cobalt to iron ratios, the shapes and sizes of the particles and the magnetic characteristics of the magnetic powders prepared in Examples 1–14 and Comparative Examples 1–2.

TABLE 1

| Ex. No. | Magnetic powder | Rare earth element content based on transition metals (Atomic %) | | | Co/Fe atomic ratio | Particle shape | Particle size (nm) | Coercive force (kA/m) | Saturation magnetization ($\mu$Wb/g) |
|---|---|---|---|---|---|---|---|---|---|
| | | Sm | Nd | Y | | | | | |
| 1 | Sm—Fe—Co | 5.6 | — | — | 29/71 | Sphere or ellipsoid | 15 | 125.7 | 21.6 |
| 2 | Sm—Fe—Co | 5.7 | — | — | 30/70 | Sphere or ellipsoid | 10 | 136.1 | 20.6 |
| 3 | Sm—Fe—Co | 5.4 | — | — | 29/71 | Sphere or ellipsoid | 20 | 123.3 | 21.9 |
| 4 | Sm—Fe—Co | 9.4 | — | — | 28/72 | Sphere or ellipsoid | 15 | 138.5 | 20.3 |
| 5 | Nd—Fe—Co | — | 5.5 | — | 29/71 | Sphere or ellipsoid | 15 | 124.1 | 21.5 |
| 6 | Y—Fe—Co | — | — | 5.6 | 28/72 | Sphere or ellipsoid | 15 | 120.2 | 21.9 |
| 7 | Sm—Y—Fe—Co | 3.8 | — | 1.6 | 28/72 | Sphere or ellipsoid | 15 | 124.9 | 21.5 |
| 8 | Sm—Fe—Co | 5.6 | — | — | 13/87 | Sphere or ellipsoid | 18 | 120.2 | 21.0 |
| 9 | Sm—Fe—Co | 1.7 | — | — | 29/71 | Sphere or ellipsoid | 15 | 102.7 | 22.7 |
| 10 | Sm—Fe—Co | 5.1 | — | — | 28/72 | Sphere or ellipsoid | 35 | 104.2 | 22.4 |
| 11 | Y—Fe | — | — | 5.5 | 0/100 | Sphere or ellipsoid | 15 | 102.8 | 19.1 |
| 12 | Y—N—Fe | — | — | 5.5 | 0/100 | Sphere or ellipsoid | 15 | 210.9 | 15.1 |
| 13 | Sm—Fe | 5.6 | — | — | 0/100 | Sphere or ellipsoid | 15 | 112.3 | 18.8 |
| 14 | Sm—N—Fe | 5.6 | — | — | 0/100 | Sphere or ellipsoid | 15 | 208.5 | 15.5 |
| C. 1 | Fe—Co | — | — | — | 29/71 | Agglomerated | 20–300 | 9.5 | 24.4 |
| C. 2 | Fe—Co | — | — | — | 29/71 | Agglomerated | 20–300 | 7.2 | 23.9 |

The magnetic powder had a saturation magnetization of 18.8 $\mu$Wb/g and a coercive force of 112.3 kA/m when measured with applying a magnetic field of 16 kOe.

Example 14

In the process of Example 13, after the reduction in the hydrogen gas stream at 450° C. for 1 hour, the reduced particles were nitrided under the same conditions as those in Example 12 and stabilized. Then the particles were recovered in the air.

According to the X-ray fluorescent analysis, the obtained magnetic powder contained 5.6 atomic % of samarium based on iron.

The obtained magnetic powder was observed with a transmission electron microscope. The powder consisted of substantially spherical or ellipsoidal having an average particle size of 15 nm.

The X-ray diffraction analysis of the magnetic powder confirmed that it had a mixed phase of iron nitride having the structure of $Fe_{16}N_2$ and the $\alpha$-Fe phase.

Example 15

Magnetite particles were prepared in the same manner as in Example 11 except that the hydrothermal treating temperature in the autoclave was changed from 180° C. to 200° C. The resulting magnetite particles had the shape close to a sphere and an average particle size of 25 nm.

The magnetic particles (10 g) was dispersed in water (500 cc) for 30 minutes using an ultrasonic disperser. Then, yttrium nitrate (2.5 g) was added to and dissolved in the dispersion followed by stirring for 30 minutes. Separately, sodium hydroxide (0.8 g) was dissolved in water (100 cc). Then, the solution of sodium hydroxide was dropwise added to the suspension of the magnetic particles over about 30 minutes followed by stirring for 1 hour. With this treatment, yttrium hydroxide was deposited on the surfaces of the magnetite particles.

The magnetite particles carrying the deposited yttrium hydroxide were washed with water, recovered by filtration and then dried at 90° C. to obtain magnetite particles carrying yttrium hydroxide deposited on their surfaces.

Those magnetite particles were reduced by heating in a hydrogen gas stream at 450° C. for 2 hours to obtain an yttrium-iron magnetic powder. Then, the temperature was lowered to 150° C. over about 1 hour while flowing the hydrogen gas. When the temperature reached 150° C., the hydrogen gas was switched to an ammonia gas, and the magnetite particles were nitrided with ammonia for 30 hours while keeping the temperature at 150° C. Thereafter, the temperature was lowered from 150° C. to 90° C. while flowing the ammonia gas. When the temperature reached 90° C., the ammonia gas was switched to a nitrogen gas containing oxygen and the particles were stabilized for 2 hours.

The temperature was then lowered from 90° C. to 40° C. while flowing the oxygen-containing nitrogen gas, and the particles were maintained at 40° C. for 10 hours and recovered in the air.

According to the X-ray fluorescent analysis, the obtained yttrium-iron nitride magnetic powder contained 5.3 atomic % of yttrium and 10.8 atomic % of nitrogen based on iron.

Figure 3:
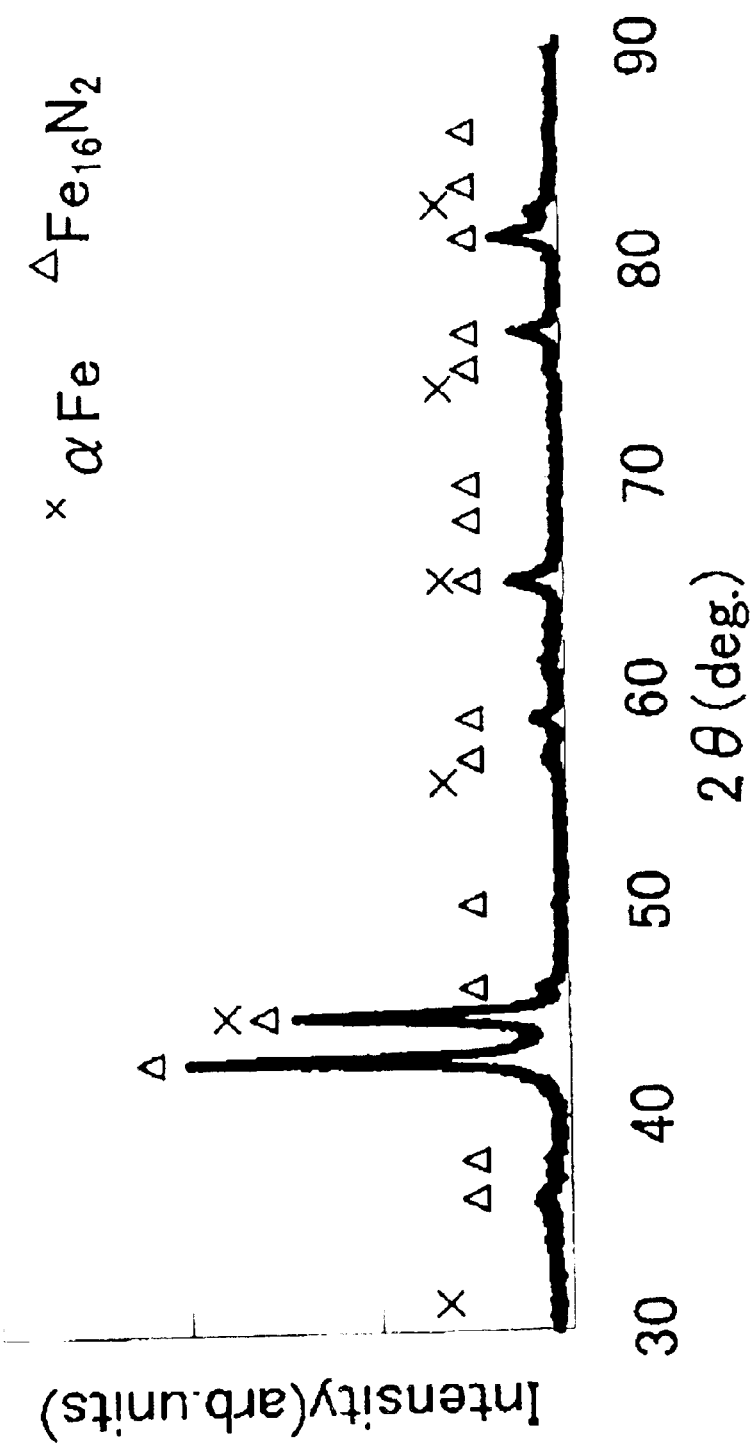
FIG. 3 is a X-ray diffraction pattern of the yttrium-iron nitride magnetic powder, which is produced in Example 15.

FIG. 3 shows the X-ray diffraction pattern of this magnetic powder, in which the diffraction peaks assigned to $Fe_{16}N_2$ and α-Fe are observed. These peaks confirmed that the powder had a mixed phase of iron nitride having the structure of $Fe_{16}N_2$ and the α-Fe phase.

Figure 4:
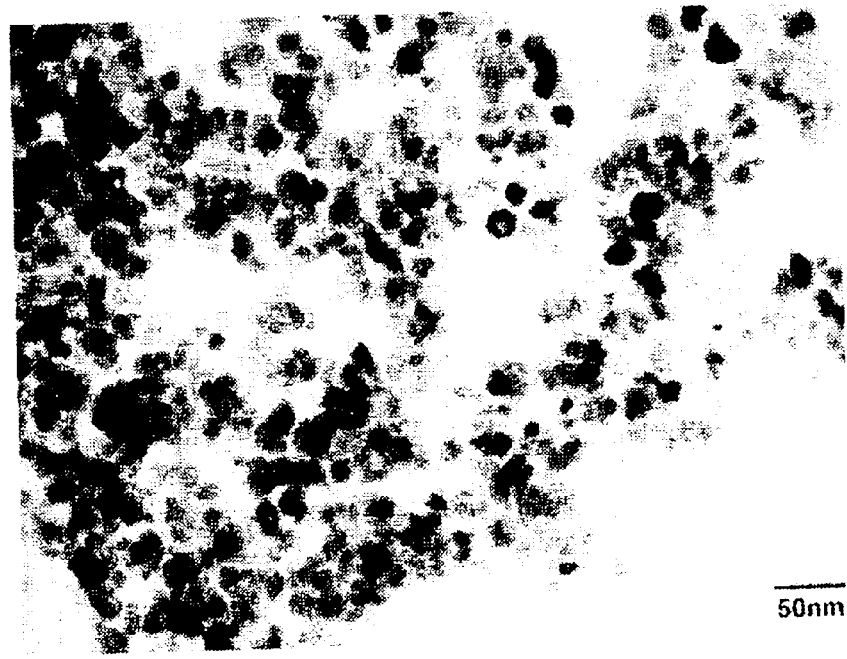
FIG. 4 is a transmission electron microscopic photograph (magnification: 200,000 times) of the yttrium-iron nitride magnetic powder, which is produced in Example 15.

The obtained magnetic powder (300 particles) was observed with a high resolution transmission electron microscope at a magnification of 200,000 times. FIG. 4 shows the transmission electron microscopic photograph of this magnetic powder. The particles had a shape close to a sphere and an average particle size of 20 nm.

The powder had a BET specific surface of 53.2 m$^2$/g.

The magnetic powder had a saturation magnetization of 17.0 μWb/g (135.2 Am$^2$/kg) and a coercive force of 226.9 kA/m when measured with applying a magnetic field of 16 kOe. After maintaining the magnetic powder at 60° C., 90% RH for one week, the magnetic powder had a saturation magnetization of 14.8 μWb/g (118.2 Am$^2$/kg), which means that a preservation rate of saturation magnetization was 87.4%.

On the other hand, a magnetic powder having spherical or ellipsoidal shape consisting of the α-Fe phase containing no $Fe_{16}N_2$ phase was produced in the same manner as in Example 15 except that no nitriding treatment was carried out. This magnetic powder had a preservation rate of saturation magnetization was 71.0%.

The magnetic powder of Example 15 had a higher preservation rate of saturation magnetization than the magnetic powder which was not nitrided, and thus good storage stability.

Example 16

A yttrium-iron nitride magnetic powder was produced in the same manner as in Example 15 except that the same magnetite particles as those used in Example 11 was used as the raw material.

According to the X-ray fluorescent analysis, the obtained yttrium-iron nitride magnetic powder contained 5.5 atomic % of yttrium and 11.9 atomic % of nitrogen based on iron.

The X-ray diffraction pattern of this magnetic powder showed the profile corresponding to the $Fe_{16}N_2$ phase.

The obtained magnetic powder (300 particles) was observed with a high resolution transmission electron microscope at a magnification of 200,000 times. The particles had spherical or ellipsoidal shapes and an average particle size of 17 nm.

The powder had a BET specific surface of 60.1 m$^2$/g.

The magnetic powder had a saturation magnetization of 16.4 μWb/g (130.5 Am$^2$/kg) and a coercive force of 211.0 kA/m when measured with applying a magnetic field of 16 kOe. After maintaining the magnetic powder at 60° C., 90% RH for one week, the magnetic powder had a saturation magnetization of 13.4 μWb/g (106.9 Am$^2$/kg), which means that a preservation rate of saturation magnetization was 81.9%.

Example 17

Magnetite particles having an average particle size of 30 nm were produced in the same manner as in Example 11 except that the hydrothermal treatment temperature was changed from 180° C. to 220° C.

A yttrium-iron nitride magnetic powder was produced in the same manner as in Example 15 except that the magnetite particles produced in the previous step were used.

According to the X-ray fluorescent analysis, the obtained yttrium-iron nitride magnetic powder contained 4.8 atomic % of yttrium and 10.1 atomic % of nitrogen based on iron.

The X-ray diffraction pattern of this magnetic powder showed the profile corresponding to the $Fe_{16}N_2$ phase.

Figure 5:
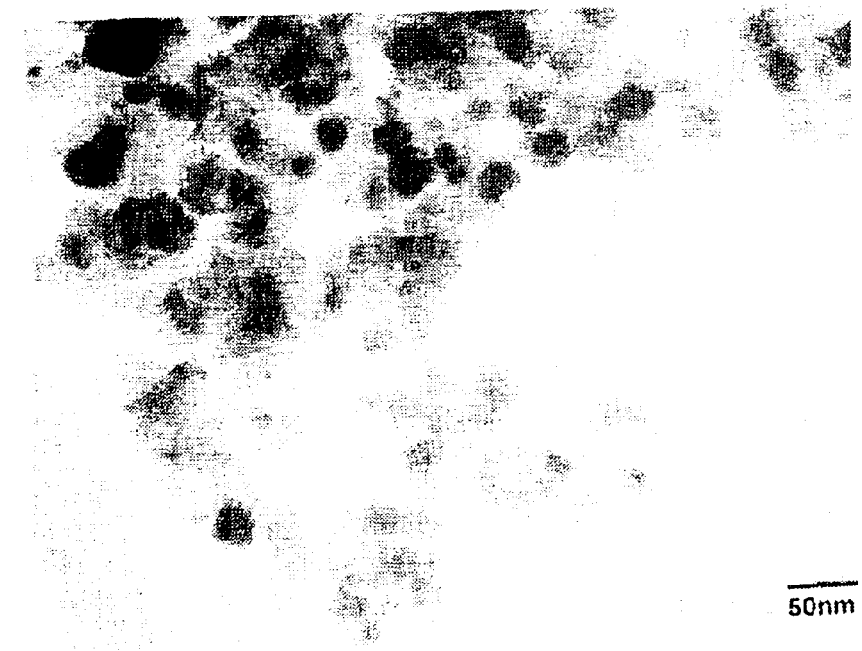
FIG. 5 is a transmission electron microscopic photograph (magnification: 200,000 times) of the yttrium-iron nitride magnetic powder, which is produced in Example 17.

The obtained magnetic powder (300 particles) was observed with a high resolution transmission electron microscope at a magnification of 200,000 times. FIG. 5 shows the transmission electron microscopic photograph of this magnetic powder. The particles had spherical or ellipsoidal shapes and an average particle size of 27 nm.

The powder had a BET specific surface of 42.0 m$^2$/g.

The magnetic powder had a saturation magnetization of 19.5 μWb/g (155.1 Am$^2$/kg) and a coercive force of 235.4 kA/m when measured with applying a magnetic field of 16 kOe. After maintaining the magnetic powder at 60° C., 90% RH for one week, the magnetic powder had a saturation magnetization of 17.6 μWb/g (140.1 Am$^2$/kg), which means that a preservation rate of saturation magnetization was 90.3%.

Production of Magnetic Tape (Examples 18–27 and Comparative Examples 3–6)

Example 18

The following components for an undercoat layer were kneaded with a kneader and dispersed with a sand mill in a residence time of 60 minutes. To the mixture, a polyisocyanate (6 parts) was added, stirred and then filtrated to obtain an undercoat paint.

Separately, the following components (1) for a magnetic paint were kneaded with a kneader and dispersed with a sand mill in a residence time of 45 minutes. To this mixture, the components (2) for the magnetic paint were added, stirred and filtrated to obtain a magnetic paint.

<Components of undercoat paint>

|  | parts |
| --- | --- |
| Titanium oxide powder (av. particle size: 0.035 μm) | 70 |
| Titanium oxide powder (av. particle size: 0.1 μm) | 10 |
| Carbon black (av. particle size: 0.075 μm) | 20 |
| Vinyl chloride copolymer ($SO_3Na$ groups: $0.7 \times 10^{-4}$ eq./g) | 10 |
| Polyester polyurethane resin ($SO_3Na$ groups: $1.0 \times 10^{-4}$ eq./g) | 5 |
| Methyl ethyl ketone | 130 |
| Toluene | 80 |
| Myristic acid | 1 |
| Butyl stearate | 1.5 |
| Cyclohexanone | 65 |

<Magnetic paint components (1)>

|  | parts |
| --- | --- |
| Samarium-cont. iron-cobalt magnetic powder according to Example 1 (Coercive force: 125.7 kA/m; Saturation magnetization: 21.6 μWb/g; Av. particle size: 15 nm; Sphere or ellipsoid) | 100 |
| Vinyl chloride-hydroxypropyl acrylate copolymer ($SO_3Na$ groups: $0.7 \times 10^{-4}$ eq./g) | 8 |
| Polyester polyurethane resin ($SO_3Na$ groups: $1.0 \times 10^{-4}$ eq./g) | 4 |
| α-Alumina (av. particle size: 0.4 μm) | 10 |
| Carbon black (av. particle size: 100 nm) | 1.5 |
| Myristic acid | 1.5 |
| Methyl ethyl ketone | 133 |
| Toluene | 100 |

<Magnetic paint components (2)>

|  | parts |
| --- | --- |
| Stearic acid | 1.5 |
| Polyisocyanate | 4 |
| Cyclohexanone | 133 |
| Toluene | 33 |

The undercoat paint was applied on a polyethylene terephthalate film (Degrees of thermal shrinkage of 0.8% and 0.6% in the machine and transverse directions, respectively after heating at 105° C. for 30 minutes) with the thickness of 6.0 μm as a non-magnetic support to form an undercoat layer having a thickness of 2 μm after drying and calendering. On the undercoat layer, the magnetic paint was applied while applying a magnetic field of 0.3 T along the machine direction so that the magnetic layer had a thickness of 0.13 μm after drying and calendering, and then dried.

Next, on the surface of the non-magnetic support opposite to the surface on which the undercoat layer and the magnetic layer were formed, a back coat paint was applied so that the back coat layer had a thickness of 0.7 μm after drying and calendering, and dried. The back coat paint was prepared by dispersing the following components with a sand mill in a residence time of 45 minutes, adding a polyisocyanate (8.5 parts) to the mixture and then stirring and filtrating the mixture.

<Components of back coat paint>

|  | parts |
| --- | --- |
| Carbon black (av. particle size: 25 nm) | 40.5 |
| Carbon black (av. particle size: 370 nm) | 0.5 |
| Barium sulfate | 4.05 |
| Nitrocellulose | 28 |
| Polyurethane resin (containing $SO_3Na$ groups) | 20 |
| Cyclohexanone | 100 |
| Toluene | 100 |
| Methyl ethyl ketone | 100 |

The produced magnetic sheet was planish finished with five-stage calendering (at 70° C. under a linear pressure of 147 kN/m) and aged at 60° C., 40% RH for 48 hours with winding the sheet around a sheet core. Then, the sheet was slit at a width of 3.8 mm, and the surface of the magnetic layer of the obtained tape was abraded with a ceramic wheel (a rotation speed of +150% and a winding angle of 30 degrees) while traveling the tape at a rate of 100 m/min. Thus, a magnetic tape having a length of 125 m was obtained. The magnetic tape was installed in a cartridge and used as a tape for a computer.

Example 19

A magnetic tape was produced in the same manner as in Example 18 except that the thickness of the magnetic layer after drying and calendering was changed to 0.25 μm.

Example 20

A magnetic tape was produced in the same manner as in Example 18 except that the thickness of the magnetic layer after drying and calendering was changed to 0.08 μm.

Example 21

A magnetic tape was produced in the same manner as in Example 18 except that the yttrium containing iron magnetic powder of Example 11 (coercive force: 102.8 kA/m, saturation magnetization: 19.1 μWb/g, average particle size: 15 nm, particle shape: sphere or ellipsoid) was used as a magnetic powder, and the thickness of the magnetic layer after drying and calendering was changed to 0.17 μm.

Example 22

A magnetic tape was produced in the same manner as in Example 18 except that the thickness of the magnetic layer after drying and calendering was changed to 0.10 μm.

Example 23

A magnetic tape was produced in the same manner as in Example 18 except that the thickness of the magnetic layer after drying and calendering was changed to 0.06 μm.

Example 24

A magnetic tape was produced in the same manner as in Example 18 except that the yttrium-containing iron nitride magnetic powder of Example 12 (coercive force: 1210.9 kA/m, saturation magnetization: 15.1 μWb/g, average particle size: 15 nm, particle shape: sphere or ellipsoid) was used as a magnetic powder, and the thickness of the magnetic layer after drying and calendering was changed to 0.14 μm.

Example 25

A magnetic tape was produced in the same manner as in Example 18 except that the samarium-containing iron nitride magnetic powder of Example 14 (coercive force: 208.5 kA/m, saturation magnetization: 15.5 µWb/g, average particle size: 15 nm, particle shape: sphere or ellipsoid) was used as a magnetic powder, and the thickness of the magnetic layer after drying and calendering was changed to 0.13 µm.

Example 26

A magnetic tape was produced in the same manner as in Example 24 except that the magnetic paint was applied on the undercoat layer without the orientation with the magnetic field so that the thickness of the magnetic layer after drying and calendering was 0.12 µm.

In Examples 18 to 25, the coated magnetic paint was subjected to the orientation treatment in the machine direction with the magnetic field to achieve the high squareness in the machine direction, while in Example 26, no orientation treatment with the magnetic field was carried out so that the same level of squareness could be attained in any directions including the machine and perpendicular directions.

In general, since the conventional magnetic powder particles have an acicular shape, they are oriented in the machine direction to some extent in the absence of the orientation treatment with the magnetic field. However, since the magnetic powder particles of the present invention have a spherical or ellipsoidal shape, they are less influenced by the mechanical orientation and thus the same level of squareness can be easily attained in any directions.

Example 27

A magnetic tape was produced in the same manner as in Example 24 except that the magnetic paint was applied on the undercoat layer while applying a magnetic field of 0.3 T in the direction perpendicular to the coated magnetic paint layer so that the thickness of the magnetic layer after drying and calendering was 0.17 µm.

In Examples 18 to 25, the coated magnetic paint was subjected to the orientation treatment in the machine direction with the magnetic field to achieve the high squareness in the machine direction, and in Example 26, the magnetic paint was applied on the undercoat layer without the orientation with the magnetic field so that the same level of squareness could be attained in any directions including the machine and perpendicular directions, while in Example 27, the magnetic field was applied in the direction perpendicular to the magnetic layer so that the high squareness could be attained in the direction perpendicular to the magnetic layer.

In general, since the conventional magnetic powder particles have an acicular shape, they are aligned on the surface of the undercoat layer in the direction perpendicular to the undercoat layer when the magnetic filed is applied in the direction perpendicular to the layer. As a result, the surface of the magnetic layer is severely deteriorated. However, since the magnetic powder particles of the present invention have a spherical or ellipsoidal shape, they have substantially no shape anisotropy and thus the produced recording media have the surface properties comparable with the magnetic media which are oriented in the machine direction even when the magnetic powder particles are oriented in the direction perpendicular to the undercoat layer.

Comparative Example 3

A magnetic tape was produced in the same manner as in Example 15 except that an acicular iron-cobalt alloy magnetic powder (Co: 24.6 atomic % based on iron; coercive force: 189.4 kA/m, saturation magnetization: 18.3 µWb/g, average major axis length: 150 nm, acicular ratio: 5) was used as a magnetic powder in the magnetic paint and the thickness of the magnetic layer after drying and calendering was changed to 0.50 µm.

Comparative Example 4

A magnetic tape was produced in the same manner as in Comparative Example 3 except that the thickness of the magnetic layer after drying and calendering was changed to 0.35 µm.

Comparative Example 5

A magnetic tape was produced in the same manner as in Comparative Example 3 except that the thickness of the magnetic layer after drying and calendering was changed to 0.20 µm.

Comparative Example 6

A magnetic tape was produced in the same manner as in Example 26 except that the iron-cobalt magnetic powder of Comparative Example 1 (coercive force: 9.5 kA/m, saturation magnetization: 24.4 µWb/g, average particle size: 20–300 nm) was used as a magnetic powder in the magnetic paint and the thickness of the magnetic layer after drying and calendering was changed to 1.1 µm.

With the magnetic tapes produced in Examples 18–27 and Comparative Examples 3–6, a coercive force (Hc), a saturated magnetic flux density (Bm), a squareness (Br/Bm) and an anisotropic magnetic field distribution (Ha) were measured as the magnetic properties.

The anisotropic magnetic field distribution was expressed by a value obtained by dividing a magnetic field corresponding to a half-width value of a differential curve in the second quadrant of the hysteresis curve (demagnetization curve) of the tape by the coercive force of the tape. That is, as the coercive force distribution of the magnetic powder is narrower or the dispersion and orientation of the magnetic powder in the tape is better, Ha is smaller. When the coercive force is the same, the smaller Ha leads to the better recording characteristics in particular in the short wavelength range.

As one of the electromagnetic conversion characteristics, a block error rate (BER) was measured by recording random data signals of a shortest recording wavelength of 0.33 µm with a DDS drive (C1554A manufactured by Hewlett-Packard) and measuring a block error rate with a block error measuring apparatus.

The results are summarized in Table 2 together with the thickness of the magnetic layer of each magnetic tape.

TABLE 2

| Ex. No. | Magnetic powder | Thickness of magnetic layer (μm) | Coercive force (MD) (kA/m) | Saturation magnetization (T) | Squareness (MD) (Br/Bm) | Squareness (TD) (Br/Bm) | Anisotropic magnetic field distribution (Ha) | BER |
|---|---|---|---|---|---|---|---|---|
| 18 | Sm—Fe—Co | 0.13 | 138.3 | 0.408 | 0.82 | — | 0.55 | 0.9 × E−03 |
| 19 | Sm—Fe—Co | 0.25 | 133.7 | 0.419 | 0.84 | — | 0.53 | 1.0 × E−03 |
| 20 | Sm—Fe—Co | 0.08 | 140.1 | 0.388 | 0.82 | — | 0.57 | 1.3 × E−03 |
| 21 | Sm—Fe—Co | 0.17 | 120.5 | 0.397 | 0.88 | — | 0.57 | 1.3 × E−03 |
| 22 | Sm—Fe—Co | 0.10 | 118.8 | 0.391 | 0.87 | — | 0.56 | 0.9 × E−03 |
| 23 | Sm—Fe—Co | 0.06 | 117.1 | 0.379 | 0.85 | — | 0.58 | 1.5 × E−03 |
| 24 | Y—N—Fe | 0.14 | 235.3 | 0.320 | 0.83 | — | 0.44 | 0.3 × E−03 |
| 25 | Sm—N—Fe | 0.13 | 232.1 | 0.325 | 0.85 | — | 0.48 | 0.4 × E−03 |
| 26 | Y—N—Fe | 0.12 | 213.2 | 0.328 | 0.63 | 0.62 | 0.50 | 2.5 × E−03 |
| 27 | Y—N—Fe | 0.17 | 137.6 | 0.311 | 0.41 | 0.77* | 0.57 | 0.9 × E−03 |
| C. 3 | Acicular Fe—Co | 0.50 | 183.8 | 0.395 | 0.83 | — | 0.61 | 1.6 × E−03 |
| C. 4 | Acicular Fe—Co | 0.35 | 183.0 | 0.373 | 0.82 | — | 0.61 | 3.8 × E−03 |
| C. 5 | Acicular Fe—Co | 0.20 | 179.9 | 0.352 | 0.80 | — | 0.65 | 7.0 × E−03 |
| C. 6 | Fe—Co | 0.9 | 22.7 | 0.316 | 0.60 | — | 1.0< | 1 × E−01< |

Note:
*Squareness in the direction perpendicular after the diamagnetic field correction.

From the results in Table 2, it can be seen that the magnetic tapes of Examples according to the present invention have the smaller anisotropic magnetic field distribution than those of Comparative Examples and that, as a result, the block error rate, which is one of the electromagnetic conversion characteristics, is small and thus the reliability of the magnetic tapes are good. These results may be due the fact that the magnetic powders comprising the rare earth element (e.g. samarium, neodymium, yttrium, etc.) and the transition metal (e.g. iron, cobalt, etc.) used in the Examples have a high coercive force based on the uniaxial crystalline magnetic anisotropy although their particle shape is sphere or ellipsoid, the magnetic powders have high saturation magnetization although their particles are very fine, and furthermore they have a high filling rate. Furthermore, the iron nitride magnetic powder containing the rare earth element such as samarium, neodymium, yttrium, etc. achieves the uniaxial anisotropy and the higher coercive force, and thus attains better block error rates.

According to the above results, it can be seen that the magnetic recording media comprising the magnetic powder according to the present invention have apparently better recording properties than those comprising the conventional acicular magnetic powder when they have the same thickness of the magnetic layers, and that such an effect is enhanced as the thickness of the magnetic layer is decreased to 0.3 μm or less. In particular, when the thickness of the magnetic layer is made very thin, for example, 0.08 μm (Example 20) or 0.10 μm (Example 21), the characteristics hardly deteriorate, and the low block error rate is maintained. Accordingly, it is understood that the magnetic recording media comprising the rare earth element-iron or rare earth element-iron nitride magnetic powder according to the present invention can exhibit their properties particularly when the thickness of the magnetic layer is 0.3 μm or less. Such an effect may be based on the specific particle shape and size of the magnetic powder of the present invention.

The magnetic tape which was produced using the magnetic powder of the present invention without the orientation in the magnetic field (Example 26) and one which was produced using the magnetic powder of the present invention with the orientation in the perpendicular direction (Example 27) have the lower block error rate than the magnetic tapes in which the magnetic powder particles were oriented in the machine direction (Examples 18–24) Such a result depends on the recording density to be measured, the forms of the media, etc. For example, the magnetic tapes of Examples 26 and 27 will exhibit excellent properties in the high recording density range, or in the form of a disc. At all events, it is apparent that the magnetic powder of the present invention exhibits the better properties than the conventional acicular magnetic powder irrespective of the presence or absence of the orientation or the direction of the magnetic field orientation.

Among the magnetic tapes of Comparative Examples 3–6 comprising the acicular magnetic powder, the magnetic tape having the thickness of the magnetic layer of smaller than 0.3 μm (Comparative Example 5) had the inferior block error rate to one having the thickness of the magnetic layer exceeding 0.3 μm (Comparative Example 4). This is because the acicular magnetic powder has the distribution when it is dispersed in the magnetic layer and some magnetic powder particles may protrude from the surface of the magnetic layer, and thus the surface smoothness of the magnetic layer is disturbed. Such a problem is fatal to the acicular magnetic powder. When the thickness of the magnetic layer of the magnetic tape comprising the acicular magnetic powder is decreased to about 0.5 μm (Comparative Example 3) or 0.3 μm (Comparative Example 4), the magnetic tapes had decreased block error rate. Those tapes had the inferior magnetic properties to the magnetic tapes of Examples having a thickness of the magnetic layer of 0.3 μm or less. Such a result is peculiar to the longitudinal recording media, since the various types of demagnetization occur as the thickness of the magnetic layer increases.

Furthermore, the magnetic tape comprising the magnetic powder consisting of iron and cobalt but containing no rare earth element has the very low coercive force and also the greatly worsened block error rate since the magnetic powder has a wide particle size distribution.

(Examples 28–30 and Comparative Example 7)

Example 28

The following components for an undercoat layer were kneaded with a kneader and dispersed with a sand mill in a residence time of 50 minutes. To the mixture, a polyisocyanate (6 parts) was added, stirred and then filtrated to obtain an undercoat paint.

<Components of undercoat paint>

| | parts |
|---|---|
| α-Iron oxide (av. major axis length: 0.14 μm; av. acicular ratio: 7) | 65 |
| α-Alumina particles (av. particle size: 0.4 μm) | 10 |
| Carbon black (av. particle size: 0.024 μm) | 18 |
| Carbon black (av. particle size: 0.075 μm) | 7 |
| Vinyl chloride-vinyl acetate-vinyl alcohol copolymer ($SO_3Na$ groups: $0.7 \times 10^{-4}$ eq./g) | 16 |
| Polyurethane resin ($SO_3Na$ groups: $1 \times 10^{-4}$ eq./g) | 7 |
| Oleyl oleate (melting point: <0° C.) | 6 |
| n-Butyl stearate (melting point 28° C.) | 2 |
| Cyclohexanone | 200 |
| Methyl ethyl ketone | 200 |

<Magnetic Paint Components>

The same magnetic paint as one used in Example 18 was used.

The undercoat paint was applied on a polyamide film having a thickness of 4 μm as a non-magnetic support to form an undercoat layer having a thickness of 2 μm after drying and calendering. On the undercoat layer which was still wet, the magnetic paint was applied while applying a magnetic field of 0.3 T along the machine direction so that the magnetic layer had a thickness of 0.20 μm after drying and calendering, and then dried.

Next, on the surface of the non-magnetic support opposite to the surface on which the undercoat layer and the magnetic layer were formed, a back coat paint was applied in the same manner as in Example 18 so that the back coat layer had a thickness of 0.7 μm after drying and calendering, and dried.

The produced magnetic sheet was planish finished with five-stage calendering (at 70° C. under a linear pressure of 147 kN/m) and aged at 60° C., 40% RH for 48 hours with winding the sheet around a sheet core. Then, the sheet was slit at a width of 3.8 mm, and the surface of the magnetic layer of the obtained tape was abraded with a ceramic wheel (a rotation speed of +120% and a winding angle of 30 degrees) while traveling the tape at a rate of 100 m/min. Thus, a magnetic tape having a length of 125 m was obtained. The magnetic tape was installed in a cartridge and used as a tape for a computer.

Example 29

A magnetic tape for a computer was produced in the same manner as in Example 28 except that 65 parts of a titanium oxide powder (Average particle size: 0.08 μm) was used as an inorganic powder in the undercoat paint in place of 65 parts of α-iron oxide (Average major axis length: 0.14 μm, average acicular ratio: 7), and the residence time in the preparation of the undercoat paint was changed to 60 minutes, and the produced magnetic sheet was planish polished by the five-stage calendering (at 800° C. under a linear pressure of 245 kN/m).

Example 30

A magnetic paint was prepared in the same manner as in Example 18 except that the yttrium-containing iron nitride magnetic powder produced in Example 12 (Coercive force: 210.9 kA/m; Saturation magnetization: 15.1 μWb/g; Average particle size: 15 nm; Particle shape: sphere or ellipsoid) was used as a magnetic powder. Then, a magnetic tape for a computer was produced in the same manner as in Example 28 except that the above-prepared magnetic paint was used.

Comparative Example 7

A magnetic tape for a computer was produced in the same manner as in Example 18 except that a samarium-containing iron acicular magnetic powder (Sm/Fe: 5.1 atomic %; Coercive force: 151.8 kA/m; Saturation magnetization: 18.3 μWb/g; Particle size: 100 nm; Particle shape: acicular; aspect ratio: 5) was used as a magnetic powder, and the residence time in the sand mill in the kneading step was changed to 30 minuets.

The acicular magnetic powder used in this Comparative Example was produced by dispersing acicular goethite (α-FeOOH) particles in the aqueous solution of a samarium salt, depositing samarium hydroxide on the surfaces of the goethite particles with the solution of an alkali, treating the goethite particles carrying samarium hydroxide with boron, and reducing the intermediate product in the hydrogen gas atmosphere, according to the method for the production of the magnetic powder of the present invention explained in the Examples.

The samarium-containing iron acicular magnetic powder used in following Comparative Example 8 was produced in the same method as described above except that the amounts of the acicular goethite as the starting material and the samarium salt were changed.

The P-V values on the magnetic layer surfaces of the magnetic tapes for the computer produced in Examples 28–30 and Comparative Example 7 were measured using the optical interference type three-dimensional surface roughness meter (TOPO-3D).

As the short wavelength output of the magnetic tapes, a peak-to-peak value of the output from a playback amplifier at the shortest recording wavelength of 0.49 μm was measured with an oscilloscope using the same DDS drive (C 1554 A) as used in the previous Examples to measure the block error rates. The measured values are expressed as relative values to that of the magnetic tape of Comparative Example 7 (100%)

The results are shown in Table 3 together with the properties of the magnetic tapes.

TABLE 3

| Ex. No. | Magnetic Powder | Shape of magnetic power particles | Particle size (nm) | Thickness of magnetic layer (μm) | P-V (nm) | Output (%) |
|---|---|---|---|---|---|---|
| Ex. 28 | Sm—Fe—Co | Sphere or ellipsoid | 15 | 0.2 | 31 | 128 |
| Ex. 29 | Sm—Fe—Co | Sphere or ellipsoid | 15 | 0.2 | 28 | 133 |
| Ex. 30 | Y—N—Fe | Sphere or ellipsoid | 15 | 0.2 | 33 | 159 |
| C. Ex. 7 | Sm—Fe | Acicular (aspect ratio: 5) | 100 | 0.2 | 81 | 100 |

As can be seen from the results of Examples 28–30 summarized in Table 3, the good output is attained even in the case of the short wavelength recording, when the magnetic powders of the present invention are used, and the P-V values, which are measured with the optical interference type three-dimensional surface roughness meter, are 50 nm or less. In particular, the magnetic tape for computer comprising the rare earth element-iron nitride magnetic powder achieves much better output in the short wavelength recording than the acicular magnetic powder.

In contrast, in the case of the magnetic tape produced in Comparative Example 7 which had the same thickness of the magnetic layer and used the samarium-containing iron magnetic powder having the same coercive force as those in Examples, the magnetic powder particles are easily agglomerated in the dispersing process, and the magnetic powder particles penetrate into the undercoat layer in the orientation step so that the surface of the magnetic layer is roughened. Thus, the surface smoothness deteriorates and the output decreases.

According to the present invention, when the thin magnetic layer having a thickness of 0.3 μm or less is formed, the deterioration of the surface smoothness of the magnetic layer, which is the problem of the conventional acicular magnetic powder, can be suppressed and the high output characteristics can be attained with the recording system using the shortest recording wavelength of 1.0 μm or less.

(Examples 31–32 and Comparative Example 8)

Example 31

The following components for an undercoat layer were kneaded with a kneader and dispersed with a sand mill in a residence time of 60 minutes. To the mixture, a polyisocyanate (6 parts) was added, stirred and then filtrated to obtain an undercoat paint.

Separately, the following components (3) for a magnetic paint were kneaded with a kneader and dispersed with a sand mill in a residence time of 50 minutes. Then, the following components (4) were added to the dispersion, stirred and filtrated to obtain a magnetic paint.

<Components of undercoat paint>

| | parts |
|---|---|
| γ-Iron oxide (av. major axis length: 0.12 μm; aspect ratio: 8; Hc: 23.9 kA/m; $\sigma_s$: 9.4 μWb/g, BET specific surface area: 25 m$^2$/g) | 65 |
| α-Alumina particles (av. particle size: 0.4 μm) | 10 |
| Carbon black (av. particle size: 0.024 μm) | 25 |
| Vinyl chloride-vinyl acetate-vinyl alcohol copolymer (SO$_3$Na groups: 0.7 × 10$^{-4}$ eq./g) | 16 |
| Polyurethane resin (SO$_3$Na groups: 1 × 10$^{-4}$ eq./g) | 7 |
| Oleyl oleate | 6 |
| n-Butyl stearate | 2 |
| Cyclohexanone | 200 |
| Methyl ethyl ketone | 200 |

<Magnetic paint components (3)>

| | parts |
|---|---|
| Samarium-cont. iron-cobalt magnetic powder according to Example 1 (Coercive force: 12.7 kA/m; Saturation magnetization: 21.6 μWb/g; Av. particle size: 15 nm; Sphere or ellipsoid) | 100 |
| Vinyl chloride-hydroxypropyl acrylate copolymer (SO$_3$Na groups: 0.7 × 10$^{-4}$ eq./g) | 8 |
| Polyester polyurethane resin (SO$_3$Na groups: 1.0 × 10$^{-4}$ eq./g) | 7 |

-continued

<Magnetic paint components (3)>

| | parts |
|---|---|
| α-Alumina (av. particle size: 0.4 μm) | 8 |
| Carbon black (av. particle size: 100 nm) | 1.5 |
| Myristic acid | 1.5 |
| Methyl ethyl ketone | 133 |
| Toluene | 100 |

<Magnetic paint component (4)>

| | Parts |
|---|---|
| Stearic acid | 1.5 |
| Polyisocyanate | 4 |
| Cyclohexanone | 133 |
| Toluene | 33 |

The undercoat paint was applied on a polyamide film (Young's modulus in the transverse direction (0.3% elongation): 15.7×10$^9$ N/m$^2$) as a non-magnetic support to form an undercoat layer having a thickness of 2 μm after drying and calendering. On the undercoat layer, the magnetic paint was applied while applying a magnetic field of 0.3 T along the machine direction so that the magnetic layer had a thickness of 0.15 μm after drying and calendering, and then dried.

Next, on the surface of the non-magnetic support opposite to the surface on which the undercoat layer and the magnetic layer were formed, a back coat paint was applied in the same manner as in Example 18 so that the back coat layer had a thickness of 0.7 μm after drying and calendering, and dried.

The produced magnetic sheet was planish finished with five-stage calendering (at 80° C. under a linear pressure of 147 kN/m) and aged at 60° C., 40% RH for 48 hours with winding the sheet around a sheet core. Then, the sheet was slit at a width of 3.8 mm, and the surface of the magnetic layer of the obtained tape was abraded with a ceramic wheel (a rotation speed of +150% and a winding angle of 30 degrees) while traveling the tape at a rate of 100 m/min. Thus, a magnetic tape having a length of 125 m was obtained. The magnetic tape was installed in a cartridge and used as a tape for a computer.

Example 32

A magnetic tape for a computer was produced in the same manner as in Example 31 except that the yttrium-containing iron nitride magnetic powder produced in Example 12 (Coercive force: 210.9 kA/m; Saturation magnetization: 15.1 μWb/g; Av. particle size: 15 nm; Particle shape: sphere or ellipsoid) was used as a magnetic powder, the amounts of the vinyl chloride-hydroxypropyl acrylate copolymer and the polyester polyurethane resin were changed to 5 parts and 10 parts, respectively, and a polyamide film (Young's modulus in the transverse direction (0.3% elongation): 13.7×10$^9$ N/m$^2$) was used as a non-magnetic support.

Comparative Example 15

A magnetic tape for a computer was produced in the same manner as in Example 31 except that a samarium-containing iron acicular magnetic powder (Sm/Fe: 5.6 atomic %; Coercive force: 165.6 kA/m; Saturation magnetization: 17.1

μWb/g; Av. particle size: 250 nm; Particle shape: acicular; Aspect ratio: 8) was used as a magnetic powder, the amounts of the vinyl chloride-hydroxypropyl acrylate copolymer and the polyester polyurethane resin were changed to 15 parts and 2 parts, respectively, and a polyester film (Young's modulus in the transverse direction.(0.3% elongation): $4.4 \times 10^9$ N/m$^2$) was used as a non-magnetic support.

The Young's moduli at 0.3% elongation in the machine direction ($Y_{MD}$) and the transverse direction ($Y_{TD}$) of the magnetic tapes for the computer produced in Examples 31–32 and Comparative Example 8 were measured using a tensile tester at 25° C., 60% RH at a stretching rate of 10%/min., and the ratio of $Y_{TD}$ to $Y_{MD}$ was calculated.

The bad head contact of the magnetic tape against the magnetic head leads to the low envelope because of the bias contact, so that the fluctuation of the output increases. Thus, the head contact was evaluated by measuring the maximum output (A) and the minimum output (B) in one track using the same drive as used in the previous Examples, and calculating the output ratio: (A−B)/[(A+B)/2].

The result are shown in Table 4 together with the properties of the magnetic tapes.

TABLE 4

| Ex. No. | Magnetic powder | Shape of magnetic powder particles | Average particle size (nm) | $Y_{TD}/Y_{MD}$ | Envelope (%) |
|---|---|---|---|---|---|
| Ex. 31 | Sm—Fe—Co | Sphere or Ellipsoid | 15 | 1.41 | 7 |
| Ex. 32 | Y—N—Fe | Sphere or Ellipsoid | 15 | 1.38 | 7 |
| C. Ex. 8 | Sm—Fe | Acicular (aspect ratio: 8 | 250 | 0.87 | 23 |

From the results of Examples 31–32 summarized in Table 4, it can be seen that the magnetic tapes of the present invention have better head contact than the magnetic tape comprising the conventional magnetic powder, when the former magnetic tapes comprise the magnetic powder of the present invention, and the ratio of the Young's modulus in the transverse direction to that in the machine direction ($Y_{TD}/Y_{MD}$) is in the range between 1.0 and 1.7, that is, the Young's modulus in the transverse direction is increased. In contrast, since the magnetic tape of Comparative Example 8 comprises the magnetic powder having the acicular shape and the large particle size, the magnetic powder particles are easily aligned in the machine direction so that the strength in the transverse direction is weaker than that in the machine direction, and thus the sliding contact against the magnetic head is localized. Accordingly, the head contact is remarkably deteriorated. According to the present invention, the strength in the transverse direction can be increased in relation to the machine direction in comparison with the conventional acicular magnetic powder, and thus the good head contact can be achieved.

What is claimed is:

1. A magnetic recording medium comprising a non-magnetic support, at least one undercoat layer containing an inorganic powder and a binder formed on said support, and a magnetic layer containing a magnetic powder and a binder formed on said at least one undercoat layer, wherein said magnetic layer has an average thickness of 0.3 μm or less, and said magnetic powder is a magnetic powder of substantially spherical or ellipsoidal particles comprising a core and an outer layer, said particles comprising a transition metal which comprises iron and a rare earth element which is mainly present in the outer layer of the magnetic powder particles, and having a particle size of 5 to 200 nm, a coercive force of 80 to 400 kA/m and a saturation magnetization of 10 to 25 μWb/g, wherein said magnetic powder particles are essentially free of boron, and wherein said magnetic powder has a uniaxial magnetic anisotropy one direction of which is a magnetization easy direction.

2. The magnetic recording medium according to claim 1, wherein said magnetic powder has an average particle size of 10 to 50 nm.

3. The magnetic recording medium according to claim 1, wherein said magnetic powder has a substantially ellipsoidal shape having an average aspect ratio of 2 or less.

4. The magnetic recording medium according to claim 1, wherein the content of the rare earth element in said magnetic powder is from 0.2 to 20 atomic % based on the transition metal.

5. The magnetic recording medium according to claim 1, wherein said rare earth element in the magnetic powder is at least one element selected from the group consisting of samarium, neodymium and yttrium.

6. The magnetic recording medium according to claim 1, wherein said transition metal in the magnetic powder comprises iron and cobalt.

7. The magnetic recording medium according to claim 6, wherein an atomic ratio of cobalt to iron is from 3:97 to 40:70.

8. The magnetic recording medium according to claim 1, wherein the core part of the magnetic powder particles comprises at least one material selected from the group consisting of metal iron, iron alloys and iron compounds.

9. The magnetic recording medium according to claim 1, wherein the core part of the magnetic powder particles comprises a mixed phase containing at least one metal component selected from the group consisting of metal iron and iron alloys, and at least one iron compound.

10. The magnetic recording medium according to claim 1, wherein the core part of the magnetic powder particles comprises at least one material selected from the group consisting of metal iron, iron alloys and iron compounds, and said iron compound is iron nitride, or iron nitride a part of iron atoms of which are replaced with at least one transition metal element.

11. The magnetic recording medium according to claim 1, wherein the core part of the magnetic powder particles comprises at least one material selected from the group consisting of metal iron, iron alloys and iron compounds, and said iron compound is $Fe_{16}N_2$, or $Fe_{16}N_2$ a part of iron atoms of which are replaced with at least one transition metal element.

12. The magnetic recording medium according to claim 1, wherein the core part of the magnetic powder particles comprises at least one iron compound selected from the group consisting of $Fe_{16}N_2$, and $Fe_{16}N_2$ a part of iron atoms of which are replaced with at least one transition metal element, and said iron comopund contains 1.0 to 20 atomic % of nitrogen based on iron.

13. The magnetic recording medium according to claim 1, wherein said magnetic layer has magnetization-easy-directions along the longitudinal direction of said magnetic layer, and said magnetic layer has a coercive force of 80 to 400 kA/m, a squareness of 0.6 to 0.9, and a saturation magnetization of 0.1 to 0.5 T in the longitudinal direction.

14. The magnetic recording medium according to claim 1, wherein said magnetic layer has magnetization-easydirections along the direction perpendicular to the plane of said magnetic layer, and said magnetic layer has a coercive force of 60 to 320 kA/m, a squareness of 0.5 to 0.8, and a saturation magnetization of 0.1 to 0.5 T in the perpendicular direction.

15. The magnetic recording medium according to claim 1, wherein said magnetic layer has magnetization-easy-directions randomly distributed in the plane of said magnetic layer, and said magnetic layer has a coercive force of 45 to 320 kA/m, a squareness of 0.4 to 0.7, and a saturation magnetization of 0.1 to 0.5 T in any direction in the plane of the magnetic layer and in the direction perpendicular to the magnetic layer.

16. A magnetic powder consisting of substantially spherical or ellipsoidal particles comprising a core and an outer layer, said particles comprising a transition metal which comprises iron and a rare earth element which is mainly present in the outer layer of the magnetic powder particles, and having a particle size of 5 to 200 nm, a coercive force of 80 to 400 kA/m and a saturation magnetization of 10 to 25 $\mu$Wb/g, wherein said magnetic powder particles are essentially free of boron.

17. The magnetic powder according to claim 16, wherein the content of said rare earth element is from 0.2 to 20 atomic % based on the transition metal.

18. The magnetic powder according to claim 16, wherein said rare earth element is at least one element selected from the group consisting of samarium, neodymium and yttrium.

19. The magnetic powder according to claim 16, wherein said transition metal comprises iron and cobalt.

20. The magnetic powder according to claim 19, wherein an atomic ratio of cobalt to iron is from 3:97 to 40:70.

21. The magnetic powder according to claim 19, wherein said transition metal further comprises nickel.

22. The magnetic powder according to claim 16, wherein the core part of the magnetic powder particles comprises at least one material selected from the group consisting of metal iron, iron alloys and iron compounds.

23. The magnetic powder according to claim 16, wherein the core part of the magnetic powder particles comprises a mixed phase containing at least one metal component selected from the group consisting of metal iron and iron alloys, and at least one iron compound.

24. The magnetic powder according to claim 16, wherein the core part of the magnetic powder particles comprises at least one material selected from the group consisting of metal iron, iron alloys and iron compounds, and said iron compound is iron nitride, or iron nitride a part of iron atoms of which are replaced with at least one transition metal element.

25. The magnetic powder according to claim 16, wherein the core part of the magnetic powder particles comprises at least one material selected from the group consisting of metal iron, iron alloys and iron compounds, and said iron compound is $Fe_{16}N_2$, or $Fe_{16}N_2$ a part of iron atoms of which are replaced with at least one transition metal element.

26. The magnetic powder according to claim 25, which is a substantially spherical or ellipsoidal rare earth-iron nitride magnetic powder comprising a rare earth element, iron and nitrogen, and containing at least a $Fe_{16}N_2$ phase, wherein the contents of the rare earth element and nitrogen are 0.2 to 20 atomic % and 1.0 to 20 atomic %, respectively based on iron, and said magnetic powder has an average particle size of 10 to 50 nm and an average aspect ratio of 2 or less.

27. The magnetic powder according to claim 26, wherein said rare earth element is at least one element selected from group consisting of samarium, neodymium and yttrium.

28. The magnetic powder according to claim 25, which has a coercive force of 119.4 to 318.5 kA/m and a saturation magnetization of 10 to 20 $\mu$Wb/g.

29. The magnetic powder according to claim 25, which has a BET specific surface area of 40 to 100 m$^2$/g.

30. A method for producing the magnetic powder according to claim 16 which contains a rare earth element and a transition metal comprising iron, said method comprising the steps of:

dispersing substantially spherical or ellipsoidal particles of magnetite or cobalt ferrite in an aqueous solution containing at least a rare earth element ion to form a dispersion, adding an aqueous solution of an alkaline material to said dispersion in a molar amount sufficient for converting said rare earth element ion to a hydroxide to form a surface layer of the hydroxide on the particles of magnetite or cobalt ferrite, recovering the particles, drying and reducing the particles by heating to obtain substantially spherical or ellipsoidal particles having a particle size of 5 to 200 nm, a coercive force of 80 to 400 kA/m and a saturation magnetization of 10 to 25 $\mu$Wb/g.

31. A method for producing the rare earth element-iron nitride magnetic powder according to claim 24 comprising the steps of:

supplying an iron hydroxide or an iron oxide in the form of particles as a raw material, depositing a rare earth element on the surface of the particles of the iron hydroxide or the iron oxide, reducing said particles carrying the rare earth element by heating, and nitriding said particles at a temperature lower than a temperature in the reducing step.

* * * * *